(12) United States Patent
Yeo et al.

(10) Patent No.: US 10,374,465 B2
(45) Date of Patent: Aug. 6, 2019

(54) WIRELESS POWER TRANSMITTER AND CONTROL METHOD THEREFOR

(71) Applicant: Samsung Electronics Co., Ltd., Suwon-si, Gyeonggi-do (KR)

(72) Inventors: Sung-Ku Yeo, Suwon-si (KR); Chong-Min Lee, Seoul (KR); Jae-Seok Park, Yongin-si (KR); Jae-Hyun Park, Suwon-si (KR); Kyung-Woo Lee, Seoul (KR); Hyo-Seok Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2 days.

(21) Appl. No.: 15/593,832

(22) Filed: May 12, 2017

(65) Prior Publication Data

US 2017/0331330 A1 Nov. 16, 2017

Related U.S. Application Data

(60) Provisional application No. 62/336,088, filed on May 13, 2016.

(30) Foreign Application Priority Data

Oct. 10, 2016 (KR) .................. 10-2016-0130879

(51) Int. Cl.
H01F 27/42 (2006.01)
H01F 37/00 (2006.01)
(Continued)

(52) U.S. Cl.
CPC .............. *H02J 50/20* (2016.02); *H01Q 3/28* (2013.01); *H01Q 3/36* (2013.01); *H01Q 9/0407* (2013.01);
(Continued)

(58) Field of Classification Search
CPC . H02J 50/20; H02J 50/40; H01Q 3/28; H01Q 9/0407; H01Q 21/065; H01Q 3/36
See application file for complete search history.

(56) References Cited

U.S. PATENT DOCUMENTS

2011/0163608 A1* 7/2011 Brohlin .................. H02J 5/005
307/104
2011/0309689 A1 12/2011 Kamata
(Continued)

FOREIGN PATENT DOCUMENTS

DE 10 2012 210314 A1 12/2013
KR 10-2011-0137747 A 12/2011
(Continued)

OTHER PUBLICATIONS

European Search Report dated Jan. 11, 2019, issued in European Patent Application No. 17796422.8.

*Primary Examiner* — Alfonso Perez Borroto
*Assistant Examiner* — Esayas G Yeshaw
(74) *Attorney, Agent, or Firm* — Jefferson IP Law, LLP

(57) ABSTRACT

A wireless power transmitting device is provided. The wireless power transmitting device includes a patch antenna, and a transmission/reception processing circuit configured to output a first signal to the patch antenna during a first period, and process a second signal output from the patch antenna during a second period, wherein the patch antenna is configured to transmit a transmission wave using the first signal, and output the second signal to the transmission/reception processing circuit using a reception wave.

20 Claims, 25 Drawing Sheets

(51) Int. Cl.
  *H01F 38/00*   (2006.01)
  *H02J 50/20*   (2016.01)
  *H02J 50/40*   (2016.01)
  *H01Q 3/36*    (2006.01)
  *H01Q 9/04*    (2006.01)
  *H01Q 21/06*   (2006.01)
  *H01Q 3/28*    (2006.01)
  *H02J 50/90*   (2016.01)
  *H02J 50/23*   (2016.01)

(52) U.S. Cl.
  CPC ........... *H01Q 21/065* (2013.01); *H02J 50/23* (2016.02); *H02J 50/40* (2016.02); *H02J 50/90* (2016.02)

(56) References Cited

U.S. PATENT DOCUMENTS

| | | | | |
|---|---|---|---|---|
| 2012/0086394 | A1* | 4/2012 | Hui | H01F 38/14 |
| | | | | 320/108 |
| 2012/0153739 | A1* | 6/2012 | Cooper | H02J 5/005 |
| | | | | 307/104 |
| 2014/0125139 | A1 | 5/2014 | Wang et al. | |
| 2014/0354063 | A1 | 12/2014 | Leabman et al. | |
| 2014/0355491 | A1* | 12/2014 | Khidre | H04B 7/24 |
| | | | | 370/277 |
| 2015/0022009 | A1 | 1/2015 | Leabman et al. | |
| 2015/0138846 | A1* | 5/2015 | Yau | H02M 3/33507 |
| | | | | 363/21.04 |
| 2015/0146583 | A1* | 5/2015 | Yoon | H04B 1/525 |
| | | | | 370/278 |
| 2015/0249491 | A1* | 9/2015 | Tsukizawa | H04B 7/0851 |
| | | | | 370/329 |
| 2015/0311725 | A1* | 10/2015 | Yamamoto | G01V 3/104 |
| | | | | 307/104 |
| 2015/0325926 | A1 | 11/2015 | Topak et al. | |
| 2016/0044738 | A1 | 2/2016 | Kwan et al. | |
| 2016/0081031 | A1* | 3/2016 | Barriac | H04W 52/0261 |
| | | | | 370/311 |
| 2016/0094092 | A1 | 3/2016 | Davlantes et al. | |
| 2017/0062953 | A1* | 3/2017 | Teshima | H01Q 21/28 |
| 2017/0141604 | A1* | 5/2017 | Park | H02J 7/025 |
| 2017/0181105 | A1* | 6/2017 | John | H04W 52/283 |
| 2018/0003801 | A1* | 1/2018 | Fujibayashi | H01Q 3/36 |

FOREIGN PATENT DOCUMENTS

| | | |
|---|---|---|
| KR | 10-2012-0001517 A | 1/2012 |
| KR | 10-2014-0058331 A | 5/2014 |
| WO | 2015/072212 A1 | 5/2015 |

* cited by examiner

WIRELESS POWER TRANSMITTER AND CONTROL METHOD THEREFOR

CROSS-REFERENCE TO RELATED APPLICATION(S)

This application claims the benefit under 35 U.S.C. § 119(e) of a U.S. Provisional application filed on May 13, 2016 in the U.S. Patent and Trademark Office and assigned Ser. No. 62/336,088, and under 35 U.S.C. § 119(a) of a Korean patent application filed on Oct. 10, 2016 in the Korean Intellectual Property Office assigned Ser. No. 10-2016-0130879, the entire disclosure of which is hereby incorporated by reference.

TECHNICAL FIELD

The present disclosure relates to a wireless power transmitting device and a control method. More particularly, the present disclosure relates to a wireless power transmitting device and method for wirelessly transmitting power to an electronic device.

BACKGROUND

Portable digital communication devices have become necessary for many people. Consumers want to be provided with various high quality services at any time and any location. In addition, due to the recent development of internet of thing (IoT) technology, various sensors, home appliances, and communication devices exist and are being networked together. In order to smoothly operate these various sensors, a wireless power transmission system is required.

The wireless power transmission includes a magnetic induction scheme, a magnetic resonance scheme, and an electromagnetic wave scheme. The electromagnetic wave scheme has advantages in long-distance power transmission compared to the other schemes.

The electromagnetic wave scheme is mainly used for long-distance power transmission, and it is important to determine the exact location of a power receiver at a long distance location to transmit power most efficiently.

The above information is presented as background information only to assist with an understanding of the present disclosure. No determination has been made, and no assertion is made, as to whether any of the above might be applicable as prior art with regard to the present disclosure.

SUMMARY

In order to charge an electronic device to be charged using, for example, the electromagnetic wave scheme, a radio frequency (RF) wave must be formed with respect to a plurality of directions, information related to power reception from the electronic device must be received and the location of the electronic device must be determined by using the information. However, it takes a long time to form an RF wave with respect to a plurality of directions and to receive power-related information. Especially, due to harmfulness to the human body, high power may not be transmitted before detecting the object to be charged. Particularly, when a user holds or wears a small terminal, the location of the terminal may frequently change.

Aspects of the present disclosure are to address at least the above-mentioned problems and/or disadvantages and to provide at least the advantages described below. Accordingly, an aspect of the present disclosure is to provide a quick determination of the terminal location for effective wireless charging.

Another aspect of the present disclosure may provide a wireless power transmitting device which can transmit a transmission wave, receive a reflected wave formed by the reflection of the transmission wave, and analyze the same, to quickly determine the location of the electronic device, and a control method for the same. In addition, various embodiments of the present disclosure may provide a wireless power transmitting device capable of quickly switching the transmission of the transmission wave and the reception of the reflected wave.

In accordance with an aspect of the present disclosure, a wireless power transmitting device is provided. The wireless power transmitting device includes a patch antenna, and a transmission/reception processing circuit configured to output a first signal to the patch antenna during a first period, and process a second signal output from the patch antenna during a second period, wherein the patch antenna is configured to transmit a transmission wave using the first signal, and output the second signal to the transmission/reception processing circuit using a reception wave.

In accordance with an aspect of the present disclosure, a wireless power transmitting device is provided. The wireless power transmitting device includes a plurality of patch antennas, and a transmission/reception processing circuit configured to input a first signal to a first part of the plurality of patch antennas and process a second signal output from the second part of the plurality of patch antennas, wherein the first part of the plurality of patch antennas is configured to transmit a transmission wave using the first signal, and wherein the second part of the plurality of patch antennas is configured to output the second signal to the transmission/reception processing circuit using a reception wave.

Accordingly, various embodiments of the present disclosure may provide a wireless power transmitting device which can transmit a transmission wave, receive a reflected wave formed by the reflection of the transmission wave, and analyze the same, so as to determine the location of an electronic device, and a control method for the same. In addition, various embodiments of the present disclosure may provide a wireless power transmitting device capable of quickly switching the transmission of a transmission wave and the reception of a reflected wave. Accordingly, an electronic device or an obstacle may be detected. In addition, since both the transmission of the transmission wave and the reception of the reflected wave can be performed, the wireless power transmitting device can receive power from another wireless power transmitting device and relay the same to enable long-distance wireless power transmission.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be notes that like references numbers are used to depict the same or similar elements, features, and structures.

DETAILED DESCRIPTION

Figure 1:
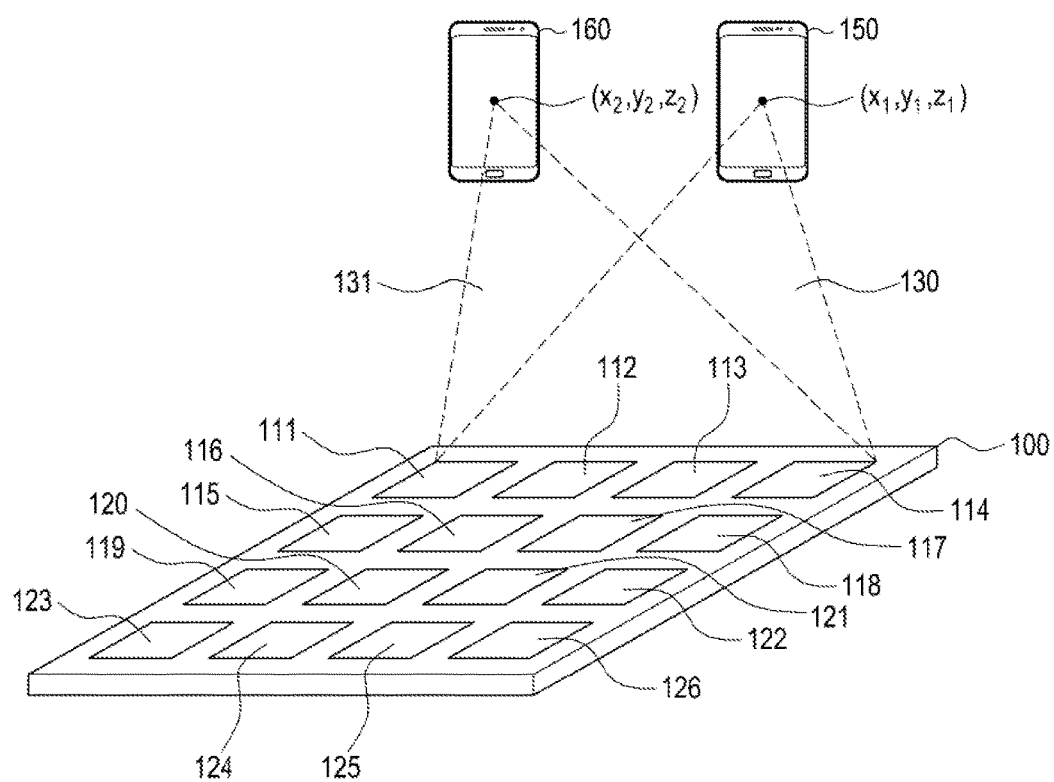
FIG. 1 illustrates a diagram of a wireless power transmission system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the description of the drawings, similar reference numerals may be used to designate similar elements. A singular expression may include a plural expression unless they are definitely different in a context. As used herein, singular forms may include plural forms as well unless the context clearly indicates otherwise. The expression "a first", "a second", "the first", or "the second" used in various embodiments of the present disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the present disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

A wireless power transmitting device or electronic device according to various embodiments of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit). In some embodiments, the wireless power transmitting device or electronic device may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a game console, an electronic dictionary, an electronic key, a camcorder, and an electronic photo frame.

In other embodiments, the wireless power transmitting device or electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a Vehicle Infotainment Device, an electronic device for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.). According to some embodiments, the wireless power transmitting device or electronic device may include at least one of a part of furniture or a building/structure, an electronic board, an electronic signature receiving device, a projector, and various types of measuring instruments (e.g., a water meter, an electric meter, a gas meter, a radio wave meter, and the like). In various embodiments, the wireless power transmitting device or electronic device may be flexible, or may be a combination of one or more of the aforementioned various devices. The wireless power transmitting device or electronic device according to embodiments of the present disclosure is not limited to the above described devices. As used herein, the term "user" may indicate a person who uses an electronic device or a device (e.g., an artificial intelligence electronic device) that uses a wireless power transmitting device or electronic device.

FIG. 1 illustrates a diagram of a wireless power transmission system according to an embodiment of the present disclosure.

Referring to FIG. 1, the wireless power transmitting device 100 may wirelessly transmit power to at least one of electronic devices 150 and 160. In various embodiments of the present disclosure, the wireless power transmitting device 100 may include a plurality of patch antennas 111 to 126. The patch antennas 111 to 126 are not limited thereto, as long as each of the patch antennas 111 to 126 is capable of generating an RF wave. At least one of the amplitude and phase of the RF wave generated by the patch antennas 111 to 126 may be controlled by the wireless power transmitting device 100. For convenience of description, the RF wave generated by each of the patch antennas 111 to 126 is referred to as a sub-RF wave.

In various embodiments of the present disclosure, the wireless power transmitting device 100 may control at least one of the amplitude and phase of each of the sub-RF waves generated by the patch antennas 111 to 126. Meanwhile, the sub-RF waves may interfere with each other. For example, at one point, the sub-RF waves may constructively interfere with each other, and at another point, the sub-RF waves may destructively interfere with each other. The wireless power transmitting device 100 may control at least one of the amplitude and phase of each of the sub-RF waves generated by the patch antennas 111 to 126 so that the sub-RF waves can constructively interfere with each other at a first point (x1, y1, z1).

For example, the wireless power transmitting device 100 may determine that the electronic device 150 is located at the first point (x1, y1, z1). The first point electronic device 150 may be, for example, a location of an antenna for receiving power of the electronic device 150. The process of determining the location of the electronic device 150 by the wireless power transmitting device 100 will be described in more detail. In order to wirelessly receive power at the electronic device 150 with high transmission efficiency, the sub-RF waves should constructively interfere at the first point (x1, y1, z1). Accordingly, the wireless power transmitting device 100 may control the patch antennas 111 to 126 so that the sub-RF wave may constructively interfere with each other. Here, controlling of the patch antennas 111 to 126 may indicate controlling of the magnitude of a signal input to the patch antennas 111 to 126 or controlling of the phase (or delay) of the signal input to the patch antennas 111 to 126. In addition, the type of beam-forming used in the present disclosure is not limited thereto. An RF wave formed by beam-forming may also be referred to as pockets of energy.

Accordingly, an RF wave 130 formed by the sub-RF waves may have the maximum amplitude at the first point (x1, y1, z1) so that the electronic device 150 may receive wireless power with high transmission efficiency. Meanwhile, the wireless power transmitting device 100 may determine that the electronic device 160 is located at a second point (x2, y2, z2). To provide wireless power to charge the electronic device 160, the wireless power transmitting device 100 may control the patch antennas 111 to 126 such that the sub-RF waves constructively interfere with each other at the second point (x2, y2, z2). Accordingly, an RF wave 131 formed from the sub-RF waves may have the maximum amplitude at the second point (x2, y2, z2) and the electronic device 160 may receive wireless power with high transmission efficiency.

As described above, the wireless power transmitting device 100 may determine the locations of the electronic devices 150 and 160, and enable sub-RF waves to constructively interfere with each other at the determined locations to perform wireless charging with high transmission efficiency. On the other hand, the wireless power transmitting device 100 enables wireless charging with high transmission efficiency only by determining the location of the electronic devices150 and 160.

Figure 2A:
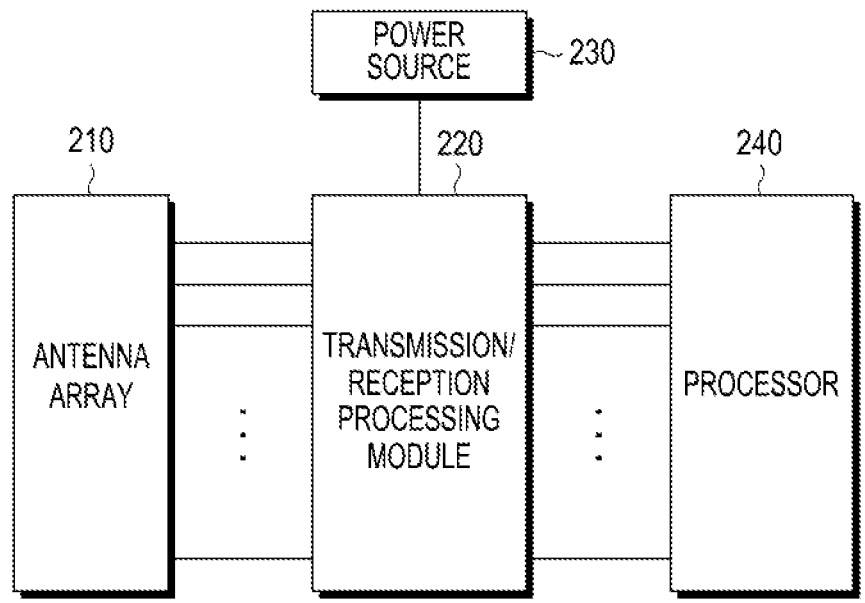
FIG. 2A illustrates a block diagram of a wireless power transmitting device according to an embodiment of the present disclosure.

FIG. 2A illustrates a block diagram of a wireless power transmitting device according to an embodiment of the present disclosure.

Referring to FIG. 2A, the wireless power transmitting device may include an antenna array 210, a transmission/reception processing circuit 220, a power source 230, and a processor 240.

The antenna array 210 may form an RF wave. The antenna array 210 may include a plurality of patch antennas, each of which may form a sub-RF wave. The power output from the power source 230 may be controlled by the transmission/reception processing circuit 220 in order to form an RF wave. The transmission/reception processing circuit 220 may include a plurality of elements for controlling power, which are connected to each of a plurality of patch antennas included in the antenna array 210. The plurality of elements may include, for example, a phase shifter for adjusting the phase of an electrical signal input into the patch antenna. The phase shifter is not limited thereto as long as the phase shifter is an element capable of changing the phase of the input electrical signal and outputting the same, and for example, HMC642 or HMC1113, or the like may be used. In another example, an amplifier may be capable of controlling the amplitude of the received input electrical signal. The amplifier may be implemented as, for example, a gain block amplifier (GBA) or the like. Here, controlling of the delay of a signal indicates that a time point at which oscillation occurs in a patch antenna is controlled to control the phase of the signal. Each of the patch antennas of the antenna array 210 may form a sub-RF wave using the received input signal. That is, the processor 240 may control the transmission/reception processing circuit 220 such that the sub-RF waves constructively interfere with each other at a particular point. Accordingly, the sub-RF waves may constructively interfere with each other at a particular point, and thus the wireless power transmitting device may perform power transmission to a particular point. For convenience of description, an RF wave formed from the antenna array 210 is referred to as a transmission wave.

Meanwhile, a patch antenna of the antenna array 210 may output a signal based on the RF wave. The patch antenna may form a RF wave using the received input electrical signal, and may receive a RF wave in the surroundings, convert the RF wave into an electrical signal, and output the same. That is, a patch antenna may form an RF wave based on the received input signal, or may output a signal based on the RF wave. For example, if the magnitude of an RF wave applied to the patch antenna changes, the amplitude of the signal output from the patch antenna may also change. Accordingly, an electrical signal corresponding to the RF wave may be output from the patch antenna. In various embodiments of the present disclosure, the RF wave output from the antenna array 210 may be reflected by an electronic device or an obstacle, and then be received at the patch antenna. An object in the surroundings, such as the electronic device or the obstacle, will be referred to as a target. For convenience of description, the RF wave reflected by the electronic device or the obstacle and received by the antenna array 210 will be referred to as a reflected wave or a reception wave. Alternatively, in various embodiments of the present disclosure, another wireless power transmitting device may form an RF wave, and the RF wave in this case will be referred to as the reception wave.

The transmission/reception processing circuit 220 may process a signal output from the antenna array 210 and output the same to the processor 240. For example, the transmission/reception processing circuit 220 may perform at least one of filtering, amplification, phase and amplitude control of the signal output from the patch antenna, and the same will be described in more detail with reference to FIG. 4. The processor 240 may detect the electronic device or the obstacle using the signal processed by the transmission/reception processing circuit 220. The processor 240 may determine the direction or location in which the electronic device or the obstacle is located and additionally operate using the determined information. For example, the wireless power transmitting device may determine at least one of the location and direction of a target, using a difference in time when a reflected wave is received by each of a plurality of patch antennas or a phase difference of the respective reflected waves received by the plurality of patch antennas. Meanwhile, the processor 240 may control entire operations of the wireless power transmitting device and an operation of hardware included in the wireless power transmitting device.

Figure 2B:
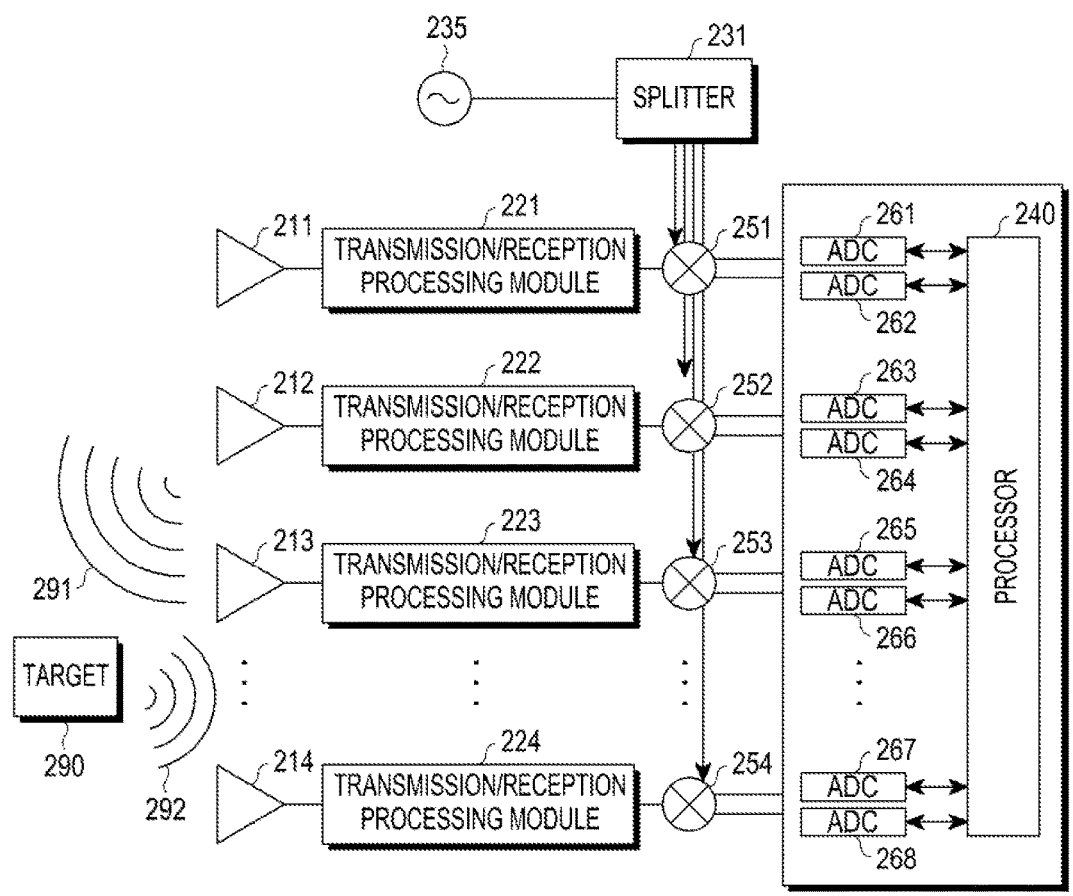
FIG. 2B illustrates a diagram of a wireless power transmitting device according to an embodiment of the present disclosure.

FIG. 2B illustrates a diagram of a wireless power transmitting device according to an embodiment of the present disclosure.

Referring to FIG. 2B, an oscillator 235 may provide a signal of an AC waveform to a splitter 231. The splitter 231 may split the received signal by the number of the patch antennas 211 to 214. The splitter 231 may transmit each of the split signals to each of mixers 251 to 254. Each of the signals from the splitter 231 may be provided to each of transmission/reception processing circuits 221 to 224 through each of the mixers 251 to 254.

The transmission/reception processing circuits 221 to 224 may process the received signals and provide the same to the patch antennas 211 to 214, respectively. In various embodiments of the present disclosure, the transmission/reception processing circuits 221 to 224 may control the phase of each of the received signals, i.e., delay each of the signals. Alternatively, the transmission/reception processing circuits 221 to 224 may control the amplitudes of the received signals. Each of the transmission/reception processing circuits 221 to 224 may control at least one of the phase and the amplitude of a signal according to the control of the processor 240, and the processor 240 may control each of the transmission/reception processing circuits 221 to 224 so as to control at least one of the phase and amplitude of the signal and perform beam-forming at a particular point. More specifically, the degree of phase control may be different, which is controlled by each of the transmission/reception processing circuits 221 to 224, and accordingly, a time point at which a sub-RF wave is oscillated in each of the patch antennas 211 to 214, or the phase of the oscillating sub-RF waves may be differently controlled, so that beam-forming for a particular point or a particular direction may be formed.

On the other hand, the processor 240 may further provide additional information, and the additional information may be mixed with a signal from the splitter 231 by each of the mixers 251 to 254. The additional information may be converted into an analog form by analog-to-digital converters (ADC) 261, 263, 265, and 267 and then provided to each of the mixers 251 to 254. The mixers 251 to 254 may modulate a signal from the oscillator 235 and output the same to the transmission/reception processing circuits 221 to 224. Alternatively, the mixers 251 to 254 may demodulate signals output from the transmission/reception processing circuits 221 to 224 and output the same to the ADCs 262, 264, 266 and 268.

Each of the patch antennas 211 to 214 may form sub-RF waves, using signals provided from each of the transmission/reception processing circuits 221 to 224. According to the above description, an RF wave which sub-RF waves oscillated from the patch antennas 211 to 214 are interfered, i.e., a transmission wave 291 may be formed. The transmission wave 291 may be formed during a first period. That is, the oscillator 235 may provide a signal to the splitter 231 during the first period, and each of the transmission/reception processing circuits 221 to 224 may process the received signal to form the transmission wave 291, and each of the patch antennas 211 to 214 may form sub-RF waves using the received signal. Accordingly, the patch antennas 211 to 214 may form sub-RF waves using signals received during the first period.

The transmission wave 291 may progress toward a target 290, and a reflected wave 292 may be generated based on a reflection by the target 290. The reflected wave 292 may progress toward the patch antennas 211 to 214. The patch antennas 211 to 214 may receive the reflected wave 292 during a second period. That is, each of the patch antennas 211 to 214 may output an electrical signal to each of the transmission/reception processing circuits 221 to 224, using the received reflected wave 292.

Each of the transmission/reception processing circuits 221 to 224 may process the received input electrical signal and provide the same to the ADCs 262, 264, 266 and 268. For example, each of the transmission/reception processing circuits 221 to 224 may control at least one of the amplitude and phase of the received input electrical signal and provide the same to the ADCs 262, 264, 266 and 268. The processor 240 may control to receive a reflected wave from a particular direction, and accordingly, each of the transmission/reception processing circuits 221 to 224 may delay the received input electrical signal according to the particular direction, i.e., control the phase of the electrical signal. More specifically, the processor 240 may determine the approximate position of the target 290 and attempt a more accurate measurement of the reflected wave 292 generated from the corresponding position. In this case, the processor 240 may determine a degree of phase control of each of the signals for forming a transmission wave which performs beamforming at the location of the target 290. The processor 240 may control the phase of the electrical signal output from each of the patch antennas 211 to 214 based on the reflected wave 292, to the degree of phase control for forming the transmission wave. Accordingly, the processor 240 may more accurately measure a signal generated from a particular direction, i.e., the reflected wave 292. The ADCs 262, 264, 266, 268 may convert the received processed signal into a digital signal and provide the same to the processor 240, and the processor 240 may analyze the converted signal to analyze a characteristic of the reflected wave 292. The processor 240 may determine at least one of whether the target 290 exists, the type of the target 290, the location of the target 290, and the direction in which the target 290 is located, based on the result of analysis of the reflected wave 292. The wireless power transmitting device may perform additional operations according to the result of determination.

As described above, the wireless power transmitting device may form the transmission wave 291 during a first period, and receive and analyze the reflected wave 292 during a second period. Accordingly, target-related information, such as whether the target 290 exists, the location, type, and direction of the target 290, or the like may be determined by only the patch antennas 211 to 214 without any other additional device.

Further, the wireless power transmitting device may control part of the patch antennas 211 to 214 to form a transmission wave, and control another part of patch antennas to receive a reception wave. In another embodiment, the wireless power transmitting device may control all of the patch antennas 211 to 214 to form the transmission wave during the first period, and control all of the patch antennas 211 to 214 to receive the reception wave during the second period.

Figure 3:
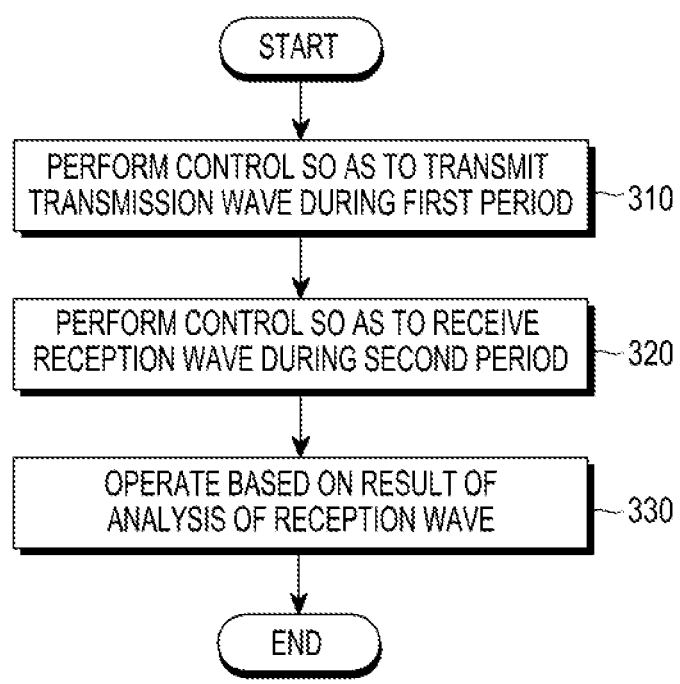
FIG. 3 is a flowchart of a method for a wireless power transmitting device according to an embodiment of the present disclosure.

FIG. 3 is a flowchart of a method for a wireless power transmitting device according to an embodiment of the present disclosure.

Referring to FIG. 3, in operation 310 the wireless power transmitting device may perform control to transmit a transmission wave, which is an RF wave, to a target during a first period. The wireless power transmitting device may control the phase and amplitude of the signal that is received by the transmission/reception processing circuit, input from a power source during a first period, and may provide the same to the patch antenna. The patch antenna may form a RF wave to transmit the transmission wave during the first period.

In operation 320, the wireless power transmitting device may receive a reflected wave (i.e., a reception wave) during a second period. To more accurately measure an RF wave oscillated from a particular direction, the wireless power transmitting device may control at least one of the phase and amplitude of the signal output using the transmission/reception processing circuit during a second period and provide the same to a processor. During the second period, the processor may determine at least one of whether a target exists, the type of the target, the location of the target, and the direction in which the target is located, based on the received signal. More specifically, the processor may determine the approximate location of the target and attempt to more accurately measurement of a reflected wave generated from the corresponding location. In this case, the processor may determine at least one of the degree of phase control and the degree of amplitude control of each of the signals for forming a transmission wave, which perform beamforming at the location of the target. The processor may control electrical signals that are output from the patch antennas based on at least one of the determined degree of phase control and the degree of amplitude control to more accurately measure a signal generated from a particular direction, that is, the reflected wave.

In operation 330, the wireless power transmitting device may operate based on the analysis result of the reflected wave, i.e., the reception wave. For example, the wireless power transmitting device may operate based on at least one of the presence or absence of a determined target, the type of the target, the location of the target, and the direction in which the target is located. For example, when the target is detected, the wireless power transmitting device may determine the type of the target or may perform wireless charging. When the target is not detected, the wireless power transmitting device may repeat operation 310 and operation 320 to determine whether the target exists. For example, when the target is the human body, the wireless power transmitting device may output a warning. The wireless power transmitting device may also determine the shape of a target based on the analysis result of a reception wave, and determine the type of the target by comparing the shape of the target with the previously stored correspondence relationship between the shape and type. When the target is the human body, the wireless power transmitting device may output a warning message. In addition, the wireless power transmitting device may not form an RF wave to the corresponding direction. When the target is a rechargeable electronic device, the wireless power transmitting device may perform wireless charging. When the target is an obstacle, the wireless power transmitting device may repeatedly perform operation 310 and operation 320 without performing wireless charging to determine whether the target exists. When at least one of a location of the target and a direction of the target is detected, the wireless power transmitting device may transmit the wireless power to the location of the target and the direction in which the target is located to perform charging.

Figure 4:
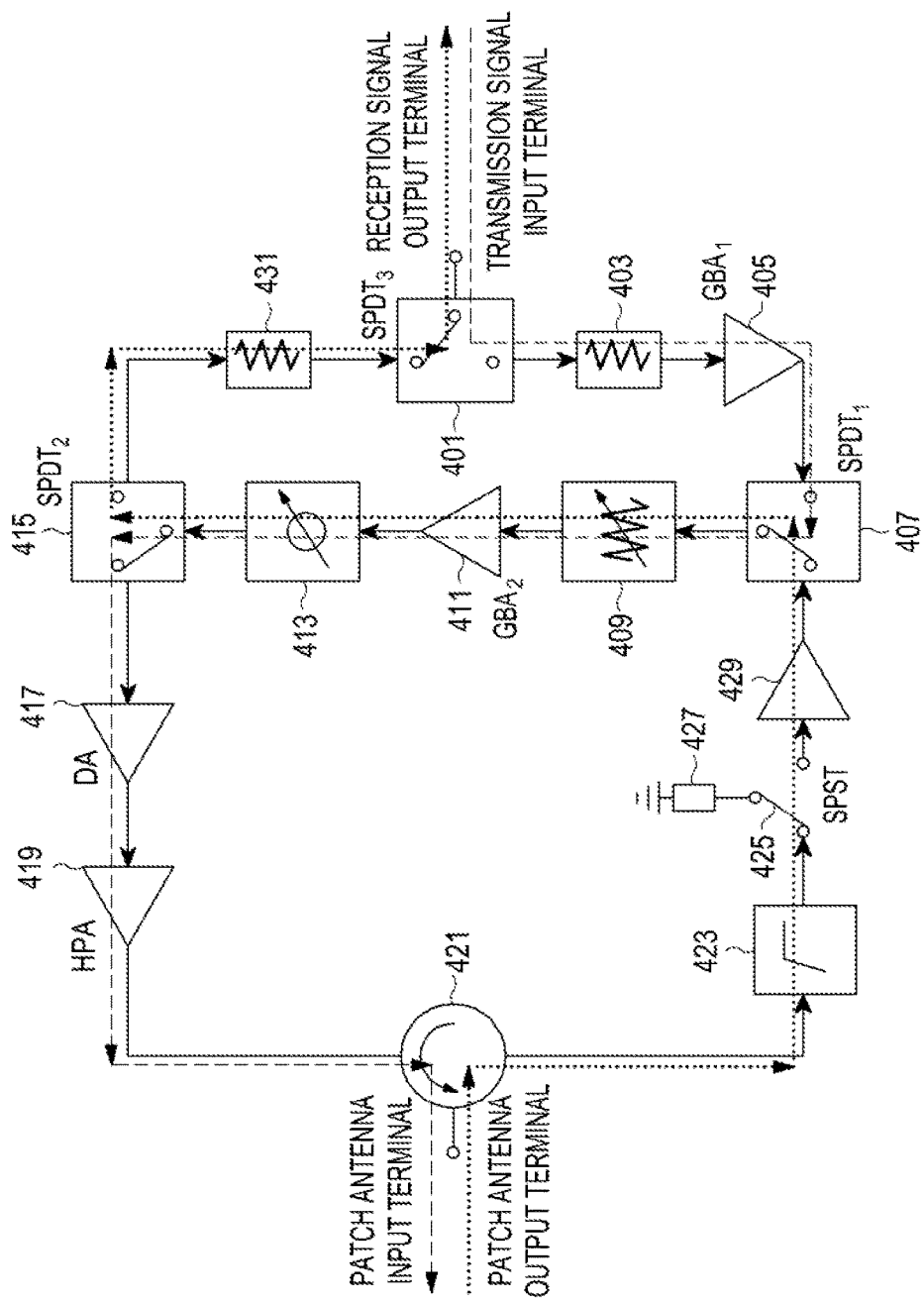
FIG. 4 is a block diagram of a transmission/reception processing circuit according to an embodiment of the present disclosure.

FIG. 4 is a block diagram of a transmission/reception processing circuit according to an embodiment of the present disclosure.

Referring to FIG. 4, the transmission/reception processing circuit may include a switch 401 capable of switching between a first path through which a transmission signal can be received and a second path through which a reception signal can be output. During a first period, i.e. during which the transmission wave is formed, the switch 401 may connect a transmission signal input terminal to a fixed attenuator 403. The switch 401 may output, for example, a signal output from a power source to the fixed attenuator 403. The fixed attenuator 403 may attenuate the amplitude of the received input signal to a fixed magnitude, and output the same to the amplifier 405. The amplifier 405 may amplify the received signal and output the same to a switch 407. The switch 407 may be connected to a variable attenuator 409 during a first period, and may be connected to an amplifier 429 during a second period. During the first period, the signal output from the amplifier 405 may be transmitted to the variable attenuator 409. The amplifier 405 may be implemented as a GBA.

The variable attenuator 409 may attenuate the amplitude to a magnitude determined by the processor or the like. The processor may determine the amplitude of a signal corresponding to each of a plurality of patch antennas to perform beamforming, and output a control signal for controlling the amplitude to the variable attenuator 409. In this case, the degree of amplitude attenuation of the signal input to each patch antenna may be different to perform beamforming. The variable attenuator 409 may attenuate the amplitude of the received signal according to the control signal, and output the same. The processor 240 may set the degree of the amplitude attenuation of each of the variable attenuators to each be different. The amplifier 411 may amplify a signal output from the variable attenuator 409, and output the same to the phase shifter 413. The amplifier 411 may be implemented as a GBA.

The phase shifter 413 may perform shifting to the phase determined by the processor or the like. For example, the phase shifter 413 may apply, to the input signal, a delay that is determined by the processor 240 or the like, and then output the same. The number of phase shifters and patch antennas may vary and the number is not limited thereto. The phase shifter may be implemented as, for example, an HMC642 phase shifter or HMC1113 phase shifter, and the like. The processor may determine the phase of a signal corresponding to each of the plurality of patch antennas or the delay to be applied to the signal, and output a control signal for the phase control to the phase shifter 413, to perform beamforming The phase shifter 413 may control the phase of the received signal according to the control signal, and output the same. The processor 240 may differently set the degree of the amplitude attenuation of each of the phase shifters of the transmission/reception processing circuit. The signal for which the phase is controlled may be output to a switch 415. In various embodiments of the present disclosure, the wireless power transmitting device may perform beamforming by controlling only one of the phase and amplitude of the signal, and, at this time, only one of the variable attenuator 409 and the phase shifter 413 may be included in the transmission/reception processing circuit.

The switch 415 may connect the phase shifter 413 to an amplifier 417 during a first period, i.e., during the transmission operation. The amplifier 417 and amplifier 419 may amplify a signal that is output from the phase shifter 413, and output the same to the circulator 421. The amplifier 417 may be implemented as a drive amplifier (DA), and the amplifier 419 may be implemented as a high power amplifier (HPA). The circulator 421 may selectively connect an input terminal and an output terminal of the patch antenna. For example, during the first period, the circulator 421 may connect the amplifier 419 to the input terminal of the patch antenna so that a signal from the amplifier 419 may be provided to the patch antenna. During this time, a connection with the output terminal of the patch antenna may be released. The patch antenna may form a sub-RF wave based on an input signal. As described above, at least one of the amplitude and phase of the signal input to the patch antenna may be controlled by at least one of the variable attenuator 409 and the phase shifter 413. Accordingly, at least one of the amplitude and phase of the sub-RF wave formed in the patch antenna may be controlled. The processor may control at least one of the variable attenuator 409 and the phase shifter 413 such that sub-RF waves formed in the plurality of patch antennas constructively interfere with each other at a particular point. As described above, during a first period, that is, in the transmission operation, an RF wave, that is, the beamforming of the transmission wave may be performed.

During a second period, i.e., when receiving a reception wave, the circulator 421 may connect the output terminal of the patch antenna to a limiter 423. During the second period, for example, the reflected wave may be received by the patch antenna, and the patch antenna may output a signal corresponding to the received reflected wave to the limiter 423. During this time, the output terminal of the patch antenna may be connected to the limiter 423, and connection with the input terminal of the patch antenna may be released. When a reflected wave having a large magnitude is suddenly received by the patch antenna, the limiter 423 may attenuate the magnitude so that the signal having a large magnitude, output from the patch antenna, does not destroy other hardware. More specifically, an overvoltage protection circuit 427 may be connected to a switch 425. The switch 425 may be implemented as a single pole single throw (SPST) switch. When the amplitude of a signal passed through the limiter 423 exceeds a predetermined threshold value, the switch 425 may connect the overvoltage protection circuit to the limiter 423 to cause the signal from the limiter 423 to flow to the ground. When the amplitude of the signal is less than or equal to a predetermined threshold value, the switch 425 may connect the limiter 423 to the amplifier 429, so that a signal from the limiter 423 may be output to the amplifier 429. The amplifier 429 may be implemented as a low noise amplifier (LNA).

Meanwhile, during the second period, the switch 407 may connect the amplifier 429 to the variable attenuator 409. In order to more accurately measure a reception wave from a particular direction, at least one of the variable attenuator 409 and the phase shifter 413 may control at least one of the amplitude and phase of the received input signal during the second period. Control information of at least one of the variable attenuator 409 and the phase shifter 413 may be determined to receive an RF wave oscillated from a particular point and transmit the control signal. During a second period, the switch 415 may connect the phase shifter 413 to the fixed attenuator 431. The fixed attenuator 431 may attenuate the received input signal and output the same to the switch 401. During a second period, the switch 401 may connect the fixed attenuator 431 to a received signal output terminal so that a signal corresponding to an RF wave received by the patch antenna may be provided to the processor. The switch 401, 407, and 415 may be implemented as a single pole double throw (SPDT) switch.

Meanwhile, depending on the implementation, at least one of the fixed attenuators 403 and 431 and the amplifiers 405 and 411 may not be included in the transmission/reception processing circuit.

As described above, the variable attenuator 409, the amplifier 411, and the phase shifter 413 may be used for transmission and reception, thereby reducing the total area of the transmission/reception processing circuit 220.

Figure 5:
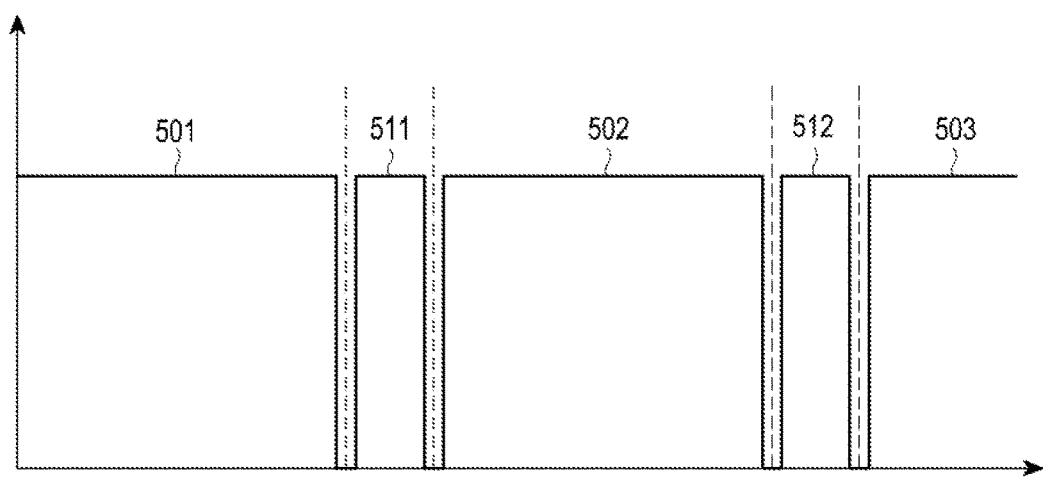
FIG. 5 illustrates a timing diagram for describing the timing of a transmission operation and a reception operation according to an embodiment of the present disclosure.

FIG. 5 illustrates a timing diagram for describing the timing of a transmission operation and a reception operation according to an embodiment of the present disclosure.

Referring to FIG. 5, during a first period 501, a third period 502, and a fifth period 503, the wireless power transmitting device may transmit a transmission wave. Accordingly, the wireless power transmitting device may connect a power source to the patch antenna, and control transmission of the transmission wave from the patch antenna to a target. Meanwhile, during a second period 511 and a fourth period 512, the wireless power transmitting device may receive a reception wave. Accordingly, the wireless power transmitting device may disconnect the power source from the patch antenna and process an electrical signal output from the patch antenna to analyze the reflected wave or the reception wave. In various embodiments of the present disclosure, transmission periods 501, 502, and 503 may be set relatively long as compared to reception periods 511 and 512. Accordingly, while performing wireless charging, the wireless power transmitting device may operate so as to transmit the transmission wave for a relatively long period, thereby enabling stable wireless charging.

Meanwhile, in another embodiment of the present disclosure, the wireless power transmitting device may control a portion of patch antennas 211 to 214 to transmit the transmission wave, and control the remaining patch antennas 211 to 214 to receive the reception wave. That is, the wireless power transmitting device may perform formation of the transmission wave and reception of the reception wave at the same time.

Figure 6A:
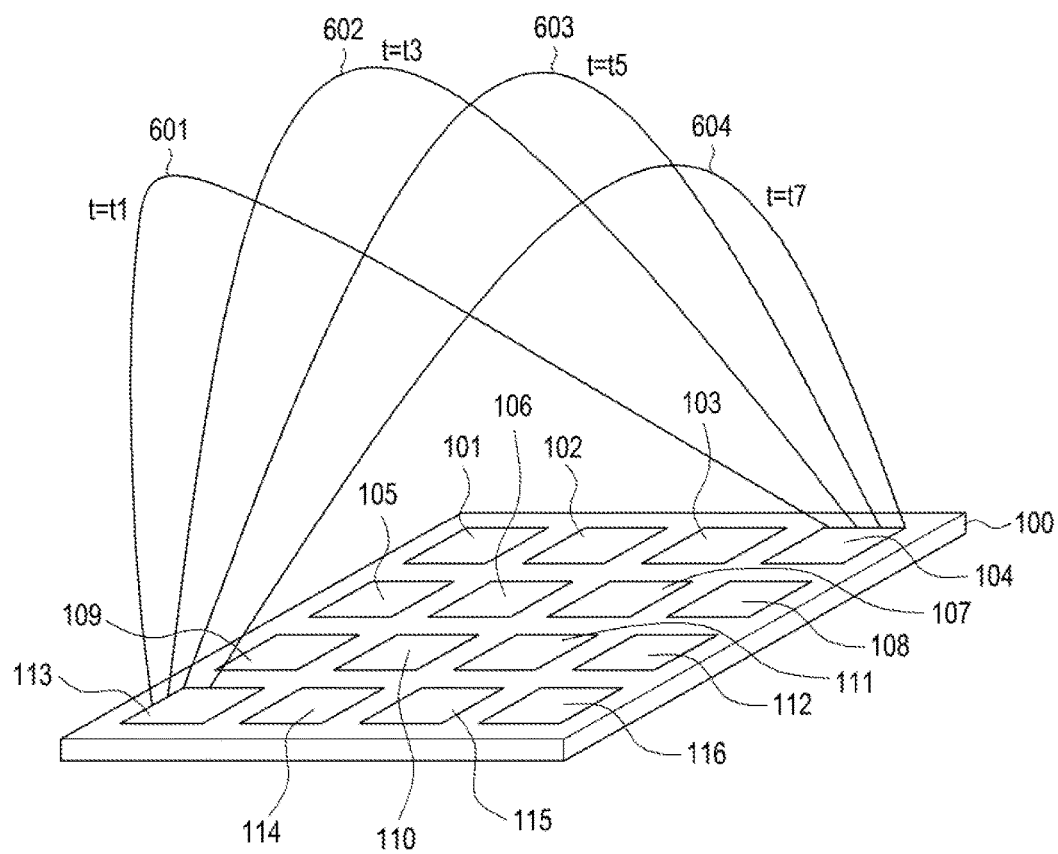
FIG. 6A illustrates a diagram of a transmission wave according to an embodiment of the present disclosure.

FIG. 6A illustrates a diagram of a transmission wave according to an embodiment of the present disclosure.

Referring to FIG. 6A, a plurality of patch antennas 101 to 116 of the wireless power transmitting device may form a transmission wave 601 in a first direction during a first period t1. For example, as in FIG. 6B, the wireless power transmitting device may apply a signal 611 for forming the transmission wave 601 to a patch antenna during the first period t1. During a second period t2, the wireless power transmitting device may receive a reflected wave or a reception wave. The wireless power transmitting device may process electrical signals output from each or some of the plurality of patch antennas 101 to 116 to analyze the reflected wave or the reception wave.

Figure 6B:
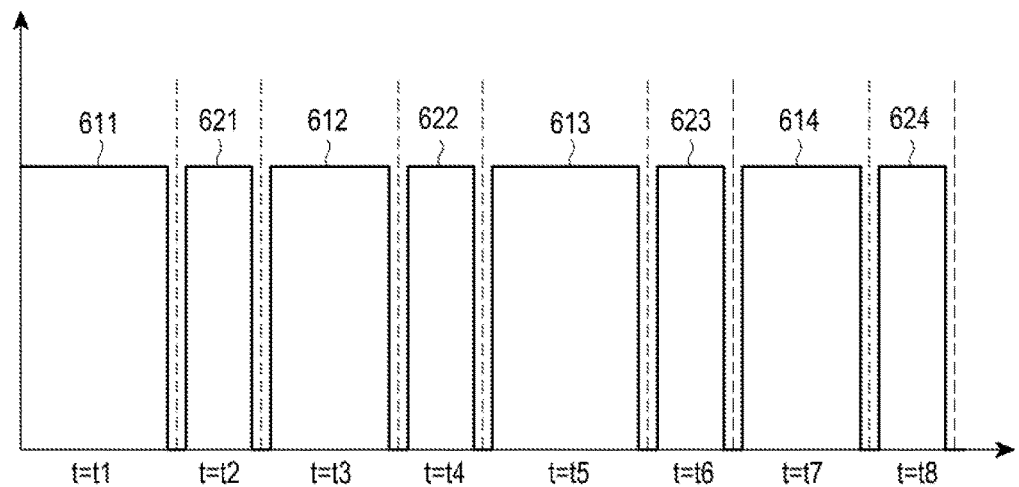
FIG. 6B illustrates a timing diagram for describing a transmission timing and a reception timing according to an embodiment of the present disclosure.

FIG. 6B illustrates a timing diagram for describing a transmission timing and a reception timing according to an embodiment of the present disclosure.

Referring to FIG. 6B, the wireless power transmitting device may process a signal 621 that is output from the patch antenna during a second period t2 and analyze the same. Meanwhile, during a third period t3, the plurality of patch antennas 101 to 116 may form a transmission wave 602 in a second direction. The wireless power transmitting device may control at least one of the amplitude and phase of a signal input to each of the plurality of patch antennas 101 to 116 to change a direction that the transmission wave is transmitted. In addition, during a fourth period t4, the wireless power transmitting device may receive the reception wave. Further, during a fifth period t5 and a seventh period t7, the wireless power transmitting device may transmit the transmission wave to transmit a transmission wave 603 in a third direction and a transmission wave 604 in a fourth direction. That is, the wireless power transmitting device may apply the signals 611, 612, 613, 614 to the patch antennas 101 to 116 to form the transmission waves in different directions in time and, in response to reflected waves corresponding thereto, the wireless power transmitting device may receive and analyze signals 621, 622, 623, 624 output from the patch antennas 101 to 116. Accordingly, the wireless power transmitting device may determine whether to arrange the target with respect to a plurality of directions.

Figure 7:
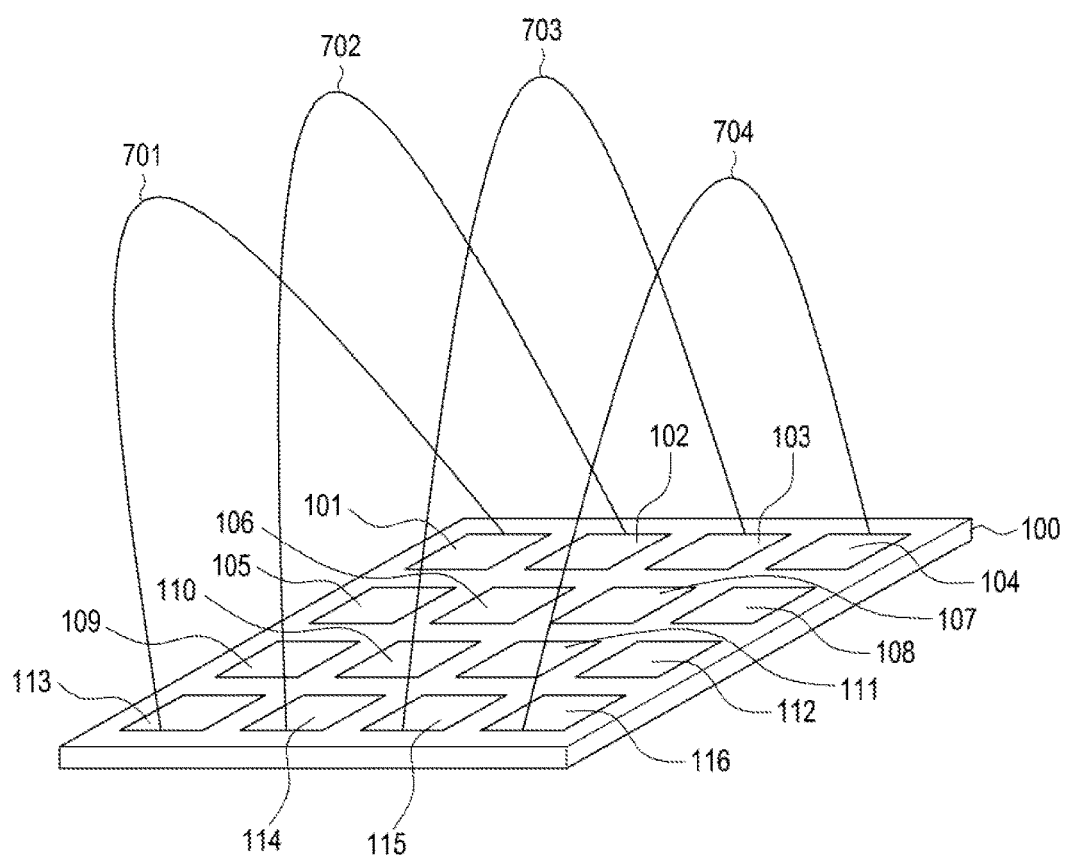
FIG. 7 illustrates a diagram for describing the formation of a transmission wave according to an embodiment of the present disclosure.

FIG. 7 illustrates a diagram for describing the formation of a transmission wave according to an embodiment of the present disclosure.

Referring to FIG. 7, the wireless power transmitting device may form a transmission wave 701 in a first direction using a first group of patch antennas formed by patch antenna 101, patch antenna 105, patch antenna 109, and patch antenna 113. The wireless power transmitting device may input signals to a second group of patch antennas (i.e., patch antenna 102, patch antenna 106, patch antenna 110, and patch antenna 114), a third group of patch antennas (i.e., patch antenna 103, patch antenna 107, patch antenna 111, and patch antenna 115), and a fourth group of patch antennas (i.e., patch antenna 104, patch antenna 108, patch antenna 112, and patch antenna 116) to transmit a transmission wave 701 in a first direction and simultaneously transmit transmission waves 702, 703, and 704 in a second direction, in a third direction, and in a fourth direction, respectively. The wireless power transmitting device may generate transmission waves 701 to 704 in a plurality of directions to detect the target at a relatively short distance. Meanwhile, when simultaneously generating the plurality of transmission waves 701 to 704, the wireless power transmitting device may include identification information in each of the transmission waves 701 to 704. Since the wireless power transmitting device may identify identification information from the reflected wave, it can be determined to which transmission wave the received reflected wave corresponds.

The wireless power transmitting device according to various embodiments of the present disclosure may adaptively transmit in different directions over time according to FIG. 6 or may simultaneously transmit transmission waves in a plurality of directions according to FIG. 7. For example, the wireless power transmitting device may operate in a method according to FIG. 7 in the operation of detecting a target in a relatively short distance, and may operate in a method according to FIG. 6A in the operation of detecting the target in a relatively long distance.

Figure 8:
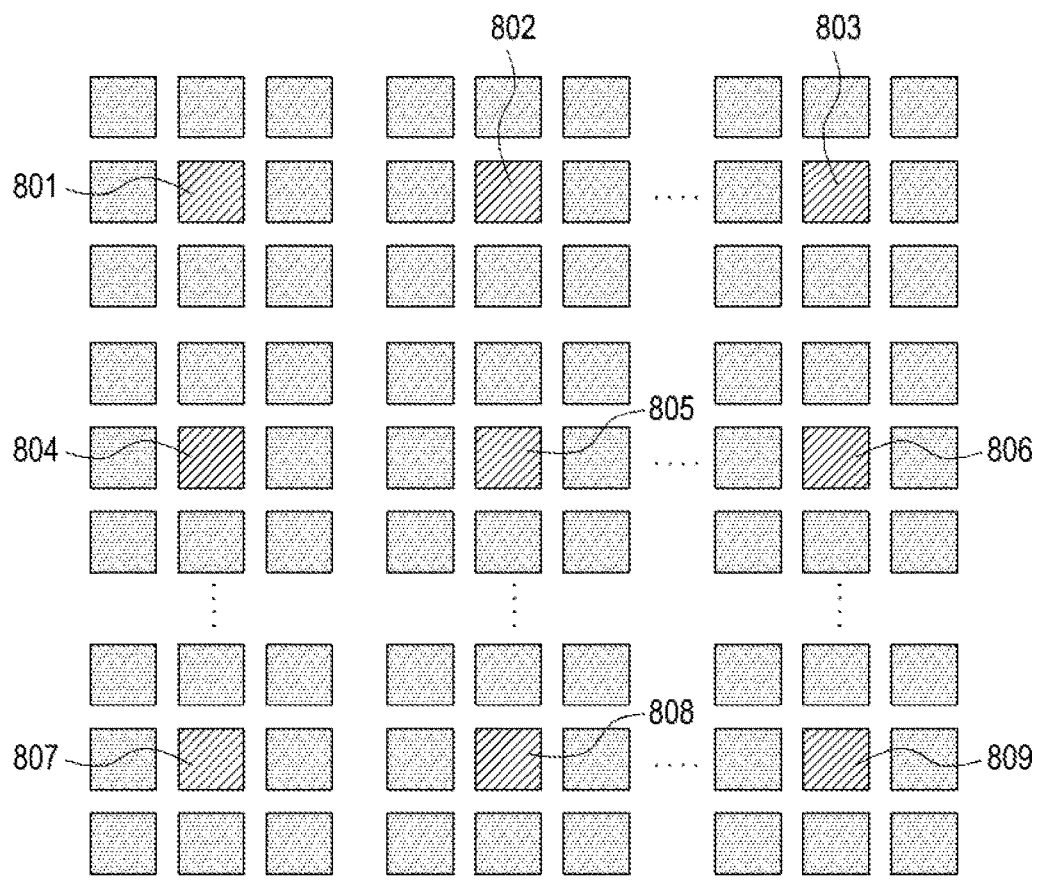
FIG. 8 illustrates a diagram of a patch antenna for transmission and a patch antenna for reception according to an embodiment of the present disclosure.

FIG. 8 illustrates a diagram of a patch antenna for transmission and a patch antenna for reception according to an embodiment of the present disclosure.

Referring to FIG. 8, the wireless power transmitting device may include a plurality of patch antennas. The wireless power transmitting device may determine that some patch antennas 801 to 809 of the plurality of patch antennas receive a reception wave, and determine that the remaining patch antennas transmit a transmission wave. The wireless power transmitting device may set the number of patch antennas 801 to 809, which will be operated for receiving the reception wave, to be relatively smaller than the number of patch antennas for transmitting the transmission wave. In FIG. 8, an antenna indicated by hatches is for receiving the reception wave, and an antenna indicated by stipples are for transmitting the transmission wave. For example, as shown in FIG. 8, the number of patch antennas for transmitting the transmission wave may be set to be relatively large while performing wireless charging by the wireless power transmitting device. Meanwhile, while detecting an accurate location of a target by the wireless power transmitting device, the number of patch antennas for receiving the reception wave may be increased. That is, the number of patch antennas for transmitting the transmission wave and the number of patch antennas for receiving the reception wave may be changed according to the operation of the wireless power transmitting device.

As the number of patch antennas for receiving the reception wave increases, the resolution may increase. That is, when the number of patch antennas used for receiving the reception wave of the wireless power transmitting device is relatively large, at least one of a more accurate location and direction of the target can be determined. Accordingly, the wireless power transmitting device may set a relatively small number of patch antennas used for receiving the reception wave for determining whether the target exists, and set a relatively large number of patch antennas used for determining at least one of the location and direction of the target. In addition, when detecting the shape of the target, the wireless power transmitting device may further increase the number of patch antennas used for receiving the reception wave.

In various embodiments of the present disclosure, the wireless power transmitting device may operate to oscillate the transmission wave in the remaining patch antennas except for some of patch antennas 801 to 809 during a first period. In addition, the wireless power transmitting device may process reflected waves that are received by some of the patch antennas 801 to 809 during a second period, and operate according to the result of processing. That is, the wireless power transmitting device may operate such that the transmission operation and the reception operation do not overlap each other in time.

In another embodiment of the present disclosure, the wireless power transmitting device may operate such that reflected waves that are received by some of the patch antennas 801 to 809 are processed while oscillating the transmission wave from the remaining patch antennas, and operate according to the result of processing. That is, the wireless power transmitting device may operate such that the transmission operation and the reception operation overlap each other. In another embodiment, a wireless power transmitting device may perform control such that some patch antennas 801 to 809 receive an external RF wave only for a particular period of time and output an electrical signal, and the remaining patch antennas continuously transmit an RF wave.

In the embodiment of FIG. 8, a patch antenna for transmission and a patch antenna for reception are distinguished from each other and may substantially operate at the same time. Meanwhile, in various embodiments of the present disclosure, the wireless power transmitting device may operate a patch antenna for transmission and a patch antenna for reception according to the time division scheme. That is, during a period for transmitting the transmission wave, the wireless power transmitting device may control the determined patch antenna for transmission to form the RF wave, and during a period for receiving the reception wave, the wireless power transmitting device may process an RF wave input to the patch antenna to analyze the reception wave. In this case, the patch antenna for transmission and the patch antenna for reception may be different as shown in FIG. 8, but in various embodiments, at least some of the patch antennas may operate as the patch antenna for transmission or the patch antenna for reception according to time.

Figure 9:
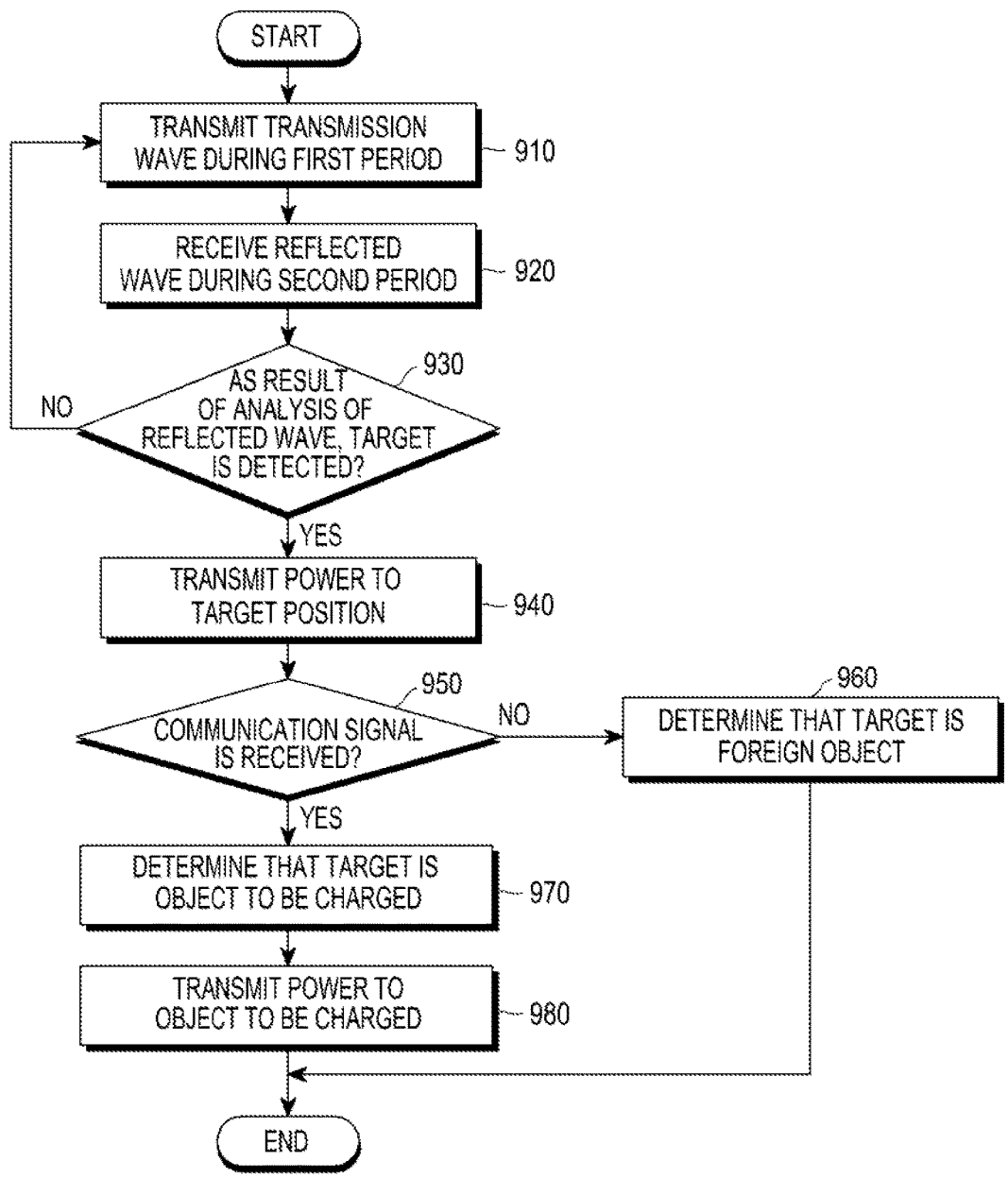
FIG. 9 is a flowchart of a method of a wireless power transmitting device according to an embodiment of the present disclosure.

FIG. 9 is a flowchart of a method of a wireless power transmitting device according to an embodiment of the present disclosure.

Referring to FIG. 9, in operation 910 the wireless power transmitting device may transmit a transmission wave during a first period. In operation 920, the wireless power transmitting device may receive a reflected wave during a second period. Meanwhile, in various embodiments of the present disclosure, the wireless power transmitting device may operate some of the patch antennas to transmit the transmission wave and operate some of the patch antennas to receive a reception wave, so that transmission of the transmission wave and reception of the reflected wave may be performed at substantially the same time.

In operation 930, the wireless power transmitting device may analyze the reflected wave to determine whether a target is detected. A configuration for determining whether the target is detected will be described in more detail with reference to FIGS. 10 to 13.

In operation 940, the wireless power transmitting device may transmit power to the location of the target. In various embodiments of the present disclosure, the wireless power transmitting device may analyze the reflected wave to determine at least one of the location and direction of the target. In operation 950, the wireless power transmitting device may determine whether a communication signal for performing wireless charging is received from the target. When it is determined that the target is an electronic device capable of performing wireless charging, the communication signal may be transmitted to the wireless power transmitting device according to a predetermined procedure. On the other hand, when the target is an obstacle, such as the human body or a metal, which cannot perform wireless charging, the communication signal may not be transmitted.

Accordingly, when the communication signal is not received, in operation 960, the wireless power transmitting device may determine that the target is the obstacle. In addition, when the communication signal is received, in operation 970, the wireless power transmitting device may determine that the target is an object to be charged. When it is determined that the target is determined to be an object to be charged, in operation 980, the wireless power transmitting device may wirelessly transmit power to the object to be charged.

Figure 10:
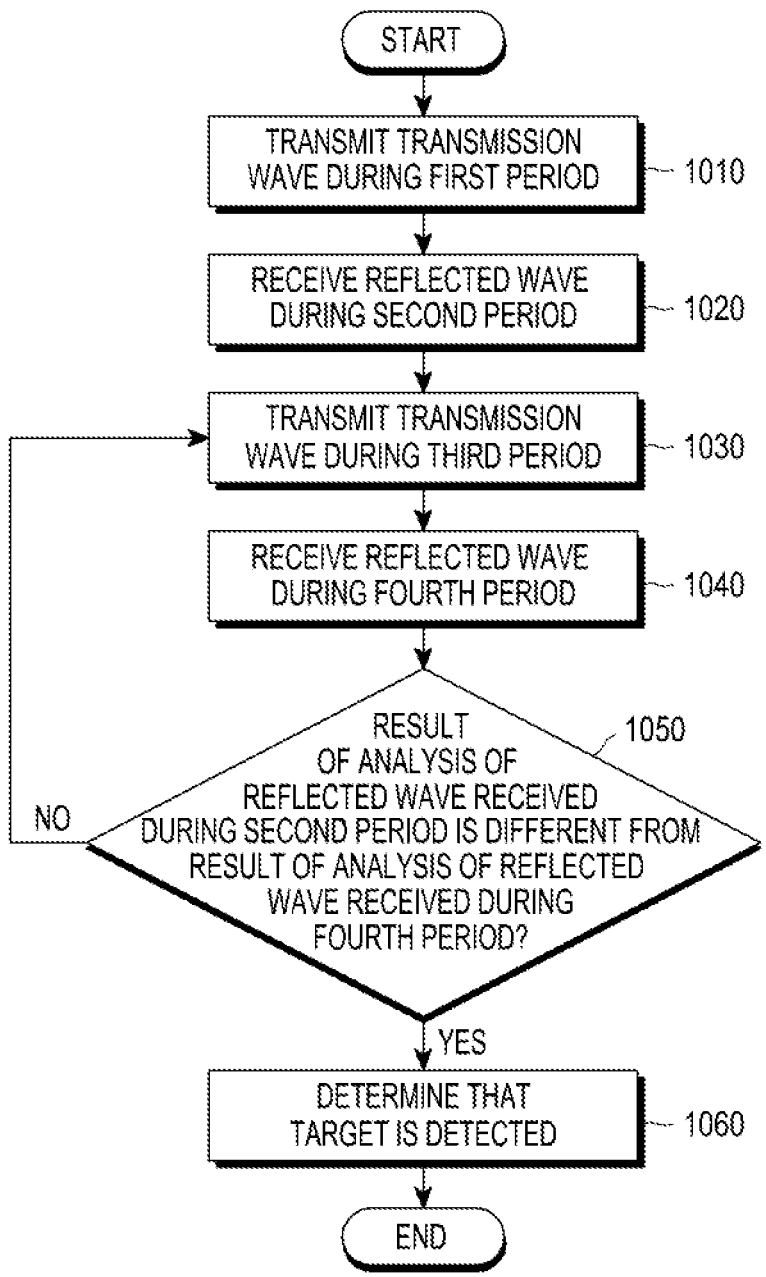
FIG. 10 is a flowchart of a method for target detection according to an embodiment of the present disclosure.

FIG. 10 is a flowchart of a method for target detection according to an embodiment of the present disclosure. The embodiment of FIG. 10 will be described in more detail with reference to FIG. 11.

Figure 11:
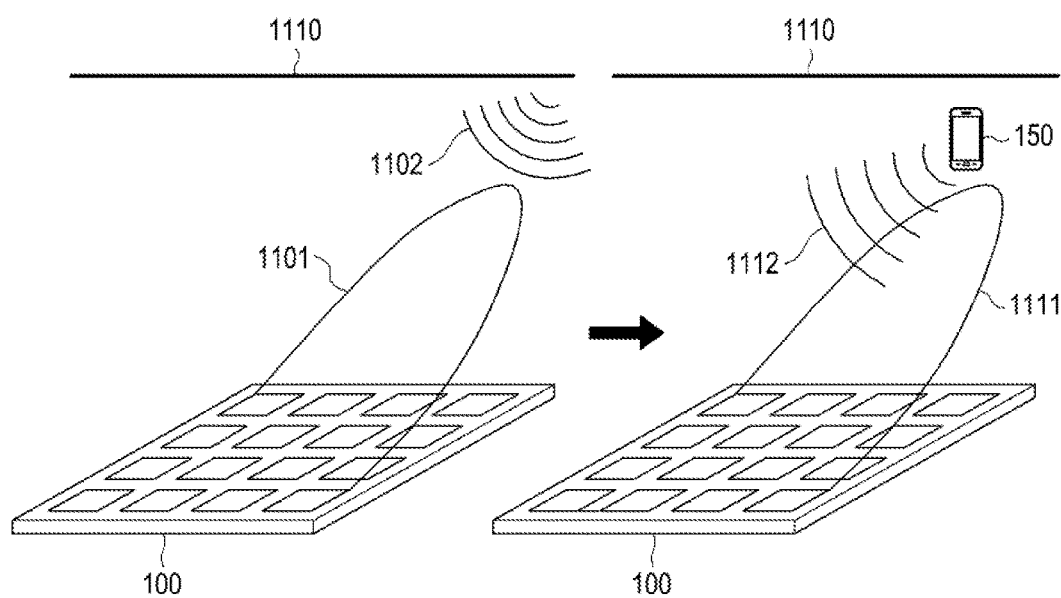
FIG. 11 illustrates a transmission wave and a reception wave according to an embodiment of the present disclosure.

FIG. 11 illustrates a transmission wave and a reception wave according to an embodiment of the present disclosure.

Referring to FIGS. 10 and 11, in operation 1010 the wireless power transmitting device may transmit a transmission wave 1101 during a first period. In operation 1020, the wireless power transmitting device may receive a reflected wave during a second period. As described above, the wireless power transmitting device may substantially perform transmitting of the transmission wave 1101 and receiving of the reflected wave 1102 at the same time. Referring to FIG. 11, only a structure 1110, such as a wall, is located around the wireless power transmitting device during the process of transmitting the transmission wave 1101 and receiving the reflected wave 1102. The transmission wave 1101 may be reflected by the structure 1110, and accordingly the reflected wave 1102 may be formed.

In operation 1030, the wireless power transmitting device may transmit a transmission wave 1111 during a third period, and receive a reflected wave 1112 during a fourth period in operation 1040. Referring to FIG. 11, a electronic device 150 appears near the wireless power transmitting device. The transmission wave 1111 may be reflected by the electronic device 150, and accordingly a reflected wave 1112 by the electronic device 150 may be formed. The reflected wave 1112 may be different from the reflected wave 1102.

In operation 1050, the wireless power transmitting device may analyze the reflected wave 1112 and determine whether the reflected wave 1102 is different from the result of analysis of the reflected wave 1112. As described above, the reflected wave 1112 may be different from the reflected wave 1102, so that the wireless power transmitting device may determine that a target is located in the direction in which the transmission waves 1101 and 1111 are formed. In operation 1060, the wireless power transmitting device may determine that the target is detected. That is, the wireless power transmitting device according to various embodiments of the present disclosure may determine that, if the result of analysis of the reflected wave is different from the previous result, the target is detected in the corresponding direction.

Figure 12:
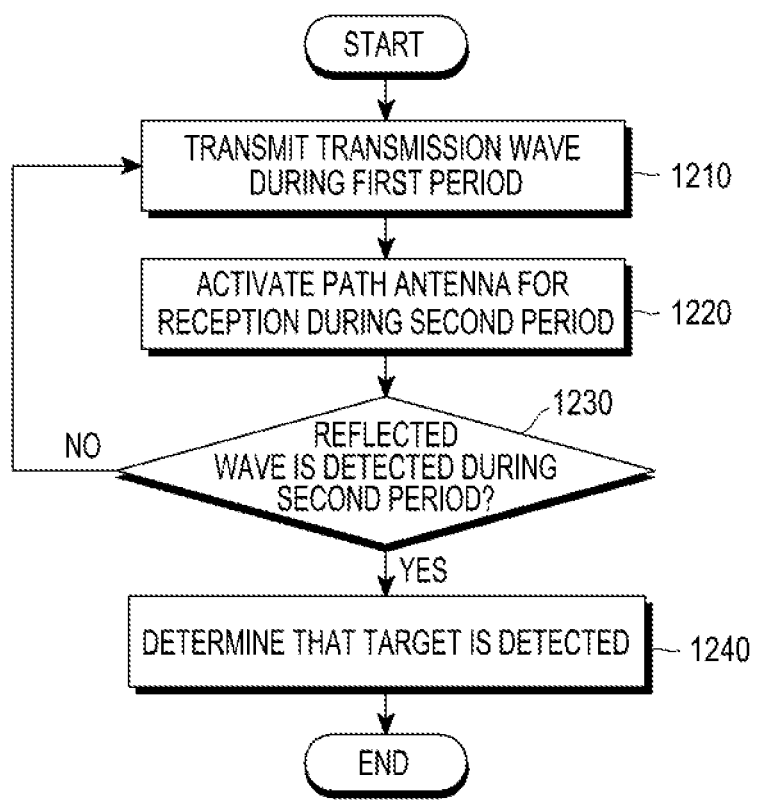
FIG. 12 is a flowchart of a method for target detection according to an embodiment of the present disclosure.

FIG. 12 is a flowchart of a method for target detection according to an embodiment of the present disclosure.

Figure 13:
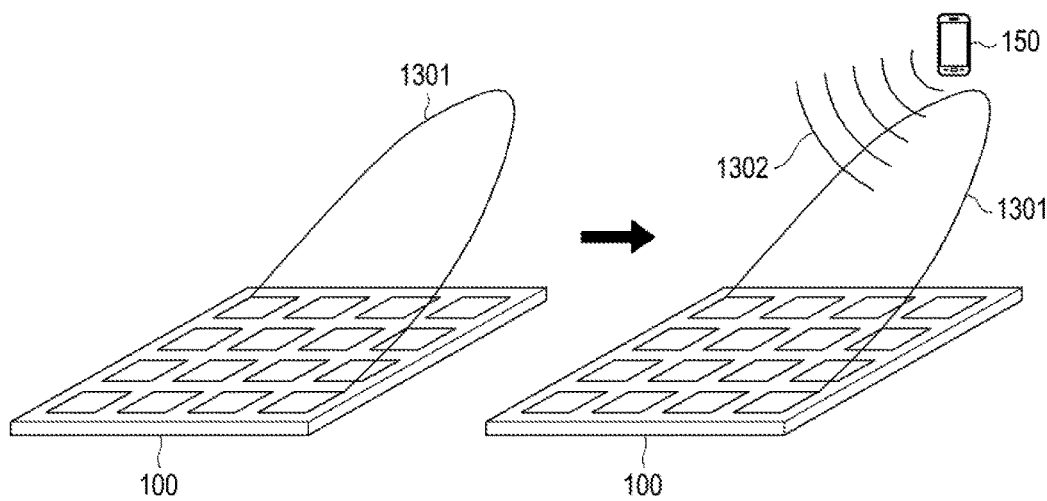
FIG. 13 illustrates a transmission wave and a reception wave according to an embodiment of the present disclosure.

FIG. 13 illustrates a transmission wave and a reception wave according to an embodiment of the present disclosure.

Referring to FIGS. 12 and 13, in operation 1210, the wireless power transmitting device may transmit a transmission wave 1301 during a first period. In operation 1220, the wireless power transmitting device may activate a patch antenna for reception during a second period. That is, the wireless power transmitting device may provide a signal output from at least some of a plurality of patch antennas to a transmission/reception processing circuit. Meanwhile, as described above, the wireless power transmitting device may substantially perform transmitting of the transmission wave 1301 and activating of the patch antenna for reception at the same time.

In operation 1230, the wireless power transmitting device may determine whether a reflected wave is detected during a second period. For example, referring to FIG. 13, since a reflected wave is not formed or is very weak when there is no target nearby, the magnitude of a signal output from a patch antenna for reception may be less than a predetermined threshold value. When the electronic device 150 is located nearby, a reflected wave 1302 may be formed. Accordingly, the magnitude of a signal output from the patch antenna for reception may be greater than or equal to a predetermined threshold value and, in operation 1240, the wireless power transmitting device may determine that the target is detected in the surroundings.

Figure 14:
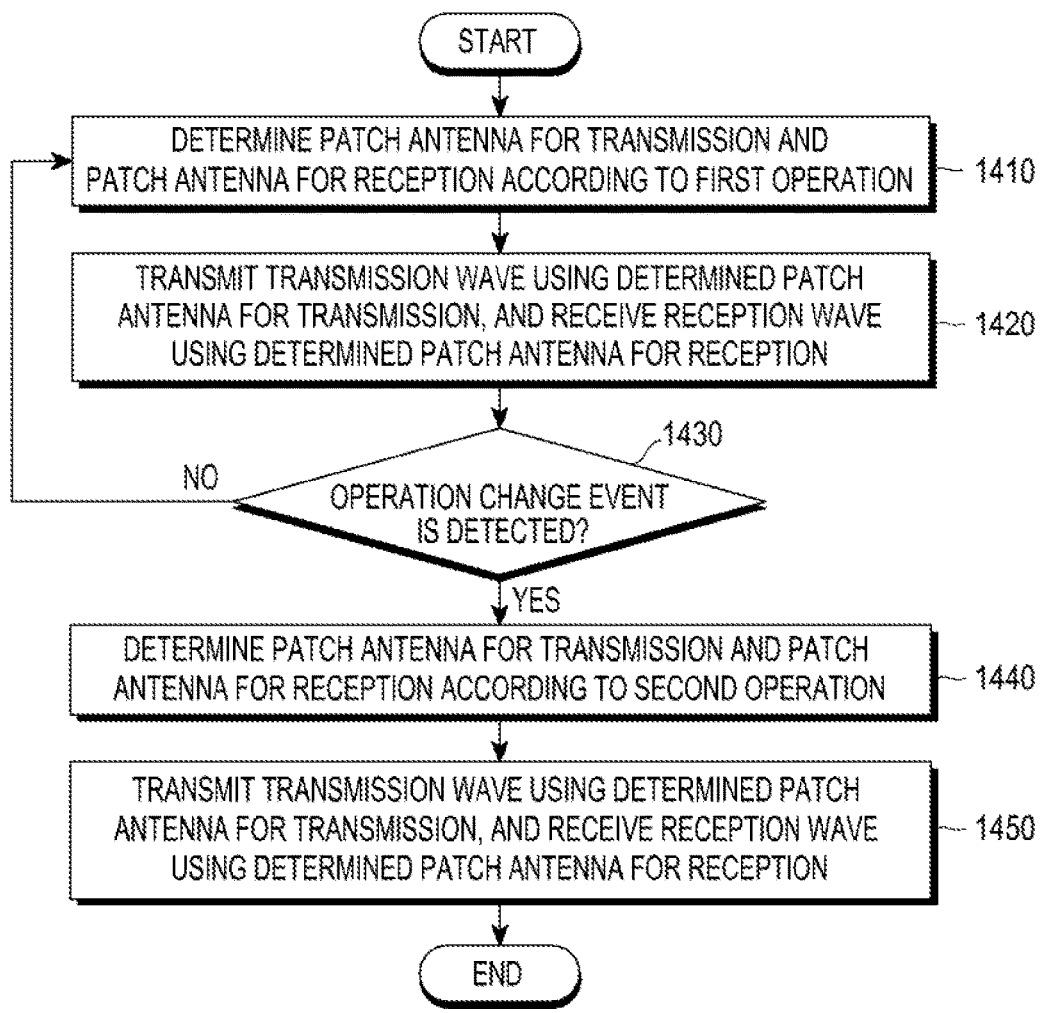
FIG. 14 is a flowchart of a method for an operation change according to an embodiment of the present disclosure.

FIG. 14 is a flowchart of a method for an operation change according to an embodiment of the present disclosure.

Referring to FIG. 14, in operation 1410 when it is determined that a first operation is to be performed, the wireless power transmitting device may determine a patch antenna for transmission and a patch antenna for reception among the plurality of patch antennas. In operation 1420, the wireless power transmitting device may transmit the transmission wave using the transmission patch antennas, and receive a reception wave or a reflected wave using the reception patch antennas.

In operation 1430, the wireless power transmitting device may determine whether an operation change event is detected. When the operation change event is detected in operation 1440, the wireless power transmitting device may determine a patch antenna for transmission and a patch antenna for reception among the plurality of patch antennas in order to perform a second operation. In various embodiments of the present disclosure, the number of transmission patch antennas and the number of reception patch antennas may be different in the first operation and the second operation. That is, the wireless power transmitting device may adaptively change the number of transmission patch antennas and reception patch antennas according to various operations. In operation 1450, the wireless power transmitting device may transmit the transmission wave using the transmission patch antennas and receive the reception wave using the reception patch antennas.

For example, the wireless power transmitting device may switch from detecting whether the target exists to detecting at least one of the location and direction of the target. As described above, a higher resolution may be required to detect the location and direction of the target. Accordingly, the wireless power transmitting device may increase the number of reception patch antennas.

For example, the wireless power transmitting device may switch to detecting the type or shape of the target. As described above, a higher resolution may be required to detect the type or shape of the target as compared to detecting at least one of the location and direction of the target. Accordingly, the wireless power transmitting device may increase the number of reception patch antennas.

For example, the wireless power transmitting device may switch from a wireless power transmission operation to a wireless power reception operation. In this case, the operation change event may be a user input for commanding wireless power reception or a reception of a wireless power reception command from other electronic devices, or the like. The wireless power transmitting device may increase the number of reception patch antennas to perform more efficient wireless charging. On the other hand, when the wireless power reception operation is switched to the wireless power transmission operation, the wireless power transmitting device may increase the number of transmission patch antennas to perform more efficient wireless charging.

As described above, at least some of the transmission patch antennas may be switched to reception patch antennas. A circulator may release a connection to the input terminal of the patch antenna and connect the output terminal of the patch antenna and the power transmission/reception processing circuit, so that the operation of at least some of the patch antennas may be switched from transmission to reception. On the other hand, when reception is switched to transmission, a circulator may connect an input terminal of the patch antenna to the power transmission/reception processing circuit, and release a connection to the output terminal of the patch antenna.

Figure 15:
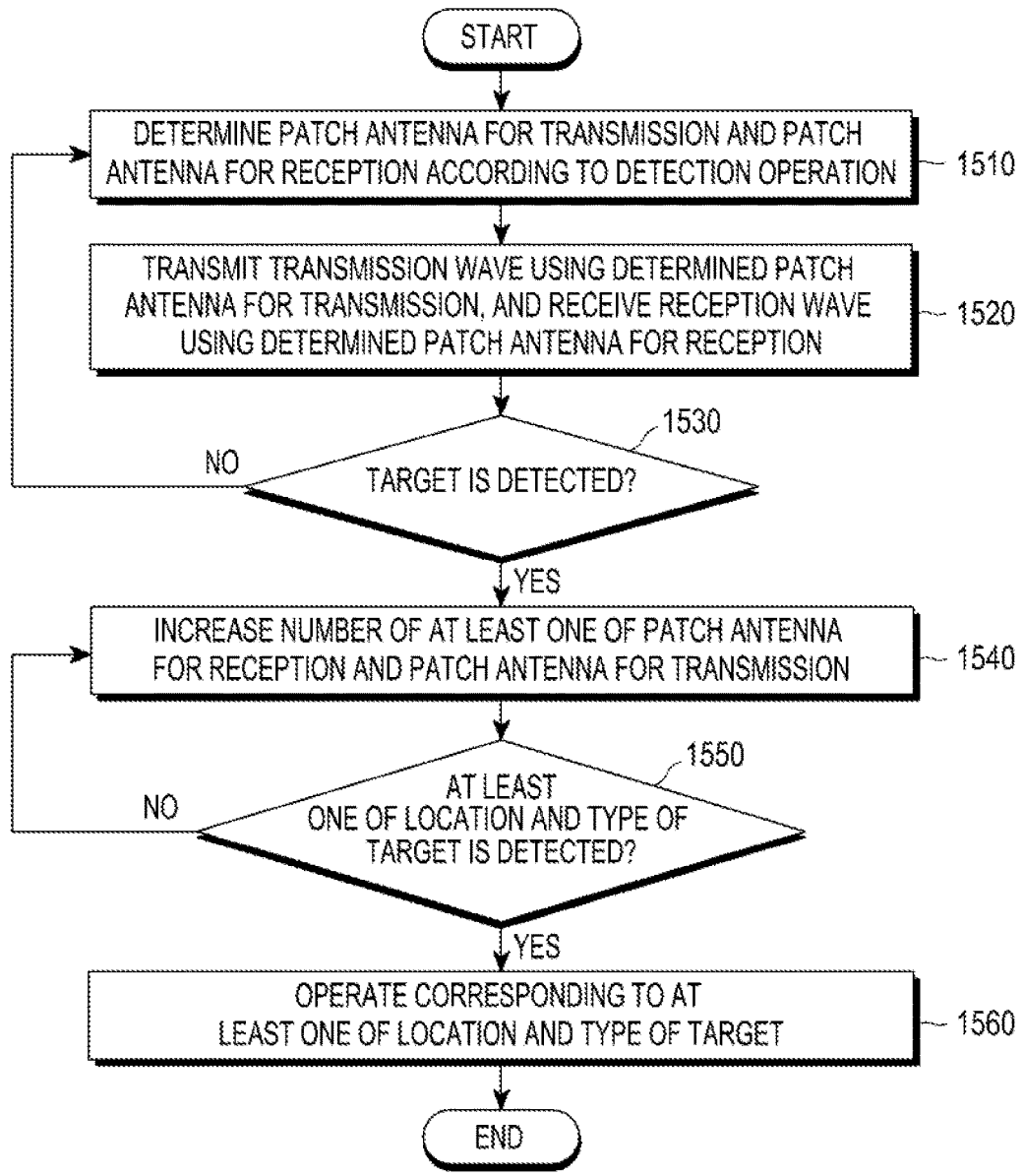
FIG. 15 is a flowchart of a method for a wireless power transmitting device according to an embodiment of the present disclosure.

FIG. 15 is a flowchart of a method for a wireless power transmitting device according to an embodiment of the present disclosure.

FIGS. 16A, 16B, 16C, and 16D illustrates a change of a patch antenna for transmission and a patch antenna for reception according to various embodiments of the present disclosure.

Referring to FIG. 15, in operation 1510 the wireless power transmitting device may determine a patch antenna for transmission and a patch antenna for reception according to the detection operation.

Figure 16A:
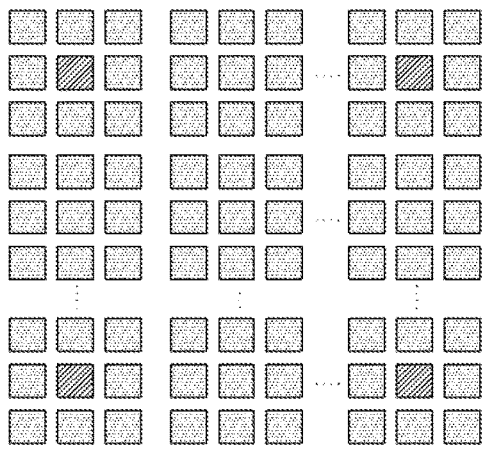
FIGS. 16A, 16B, 16C, and 16D illustrate a change of a patch antenna for transmission and a patch antenna for reception according to an embodiment of the present disclosure.
Figure 16B:
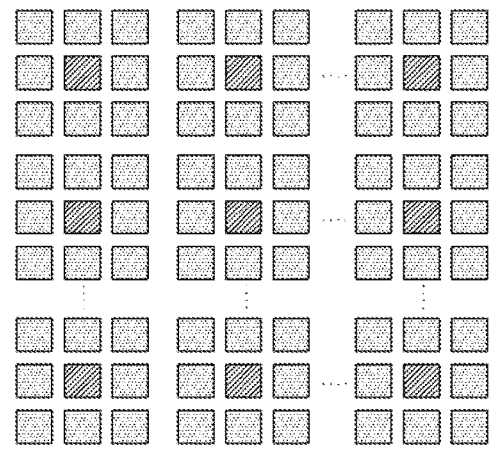
Figure 16C:
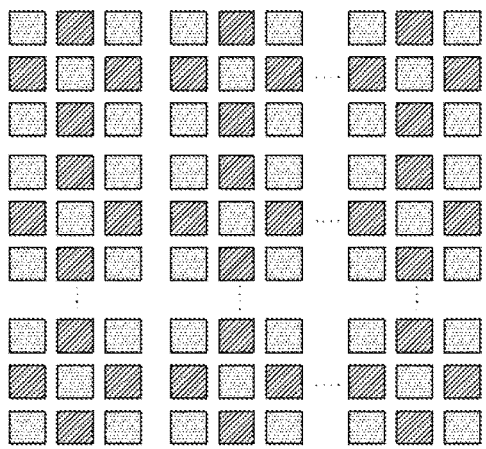
Figure 16D:
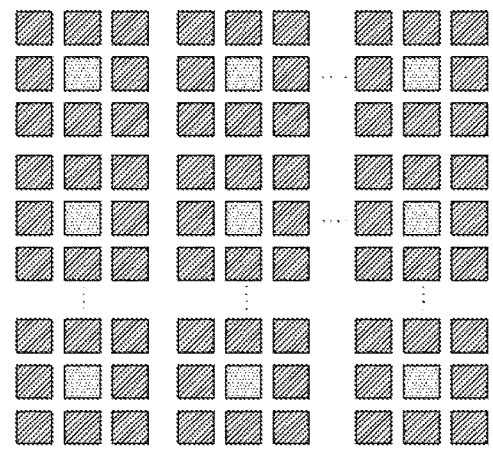

For example, referring to FIG. 16A, the wireless power transmitting device may determine four patch antennas among 81 patch antennas as the reception patch antennas and determine the remaining patch antennas as the transmission patch antennas. A relatively small number of patch antennas may be predetermined as reception patch antennas to detect, i.e., determine whether the target exists. In FIG. 16A, antennas that are hatched are reception patch antennas and antennas that are stippled are transmission patch antennas.

In operation 1520, the wireless power transmitting device may transmit the transmission wave using the transmission patch antennas and receive the reception wave using the reception patch antennas. In operation 1530, the wireless power transmitting device may determine whether the target is detected.

When the target is detected, in operation 1540, the wireless power transmitting device may increase the number of at least one of reception patch antennas and transmission patch antennas. For example, referring to FIG. 16B, the wireless power transmitting device may increase the number of reception patch antennas to determine the type or shape of the target or to detect at least one of the location and direction of the target. Alternatively, referring to FIGS. 16C and 16D, the wireless power transmitting device may increase the number of reception patch antennas to detect the location of a dynamic target.

Referring back to FIG. 15, in operation 1550, the wireless power transmitting device may detect at least one of the location and type of the target. When at least one of the location and type of the target is detected, in operation 1560, the wireless power transmitting device may operate in response to at least one of the location and type of the target. In various embodiments of the present disclosure, the wireless power transmitting device may detect at least one of the location and type of the target, using at least one of the number of patch antennas receiving the reception wave, the location of patch antennas receiving the reception wave, and the magnitude of the reception wave received by the patch antenna. For example, the wireless power transmitting device may determine the type of the target according to the shape of the target. The wireless power transmitting device may determine the shape of the target based on the result of analysis of the reflected wave, and determine the type of the target by comparing the shape of the target with the previously stored correspondence relationship between shape and type. When it is determined that the target is the human body, the wireless power transmitting device may output a warning message. When it is determined that the type of the target is an electronic device, the wireless power transmitting device performs charging by transmitting the transmission wave toward the target based on at least one of the location and direction of the detected target.

Referring to FIG. 16A, the transmission patch antennas and the reception patch antennas are distinguished from each other and may substantially operate at the same time. Meanwhile, in various embodiments of the present disclosure, the wireless power transmitting device may alternately operate transmission patch antennas and reception patch antennas according to a time division scheme. That is, during a period for transmitting the transmission wave, the wireless power transmitting device may control the transmission patch antennas to transmit the RF wave, and during a period for receiving the reception wave, the wireless power transmitting device may process an RF wave input to the patch antenna, so as to analyze the reception wave. In this case, the transmission patch antennas and the reception patch antennas may be different as shown in FIG. 16A, but in various embodiments, at least some of the patch antennas may operate as the transmission patch antenna or the reception patch antenna according to time.

Figure 17A:
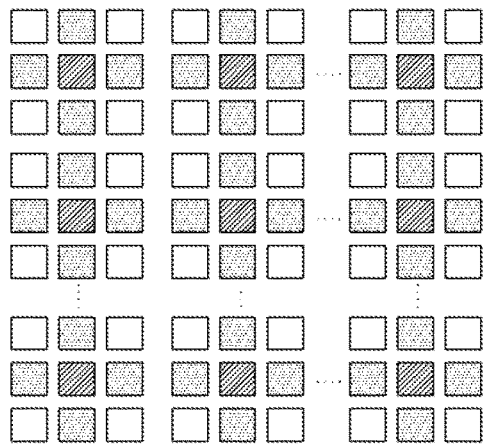
FIGS. 17A, 17B, and 17C illustrate an arrangement of a patch antenna for transmission and a patch antenna for reception according to an embodiment of the present disclosure.
Figure 17B:
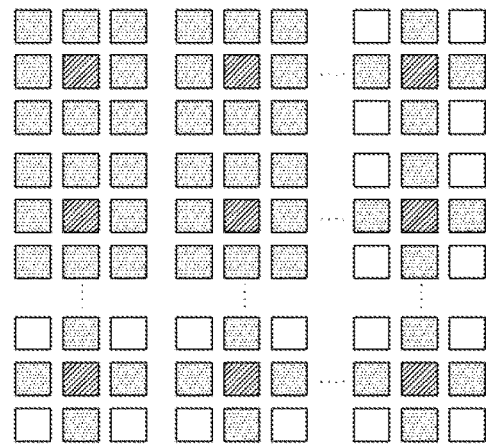
Figure 17C:
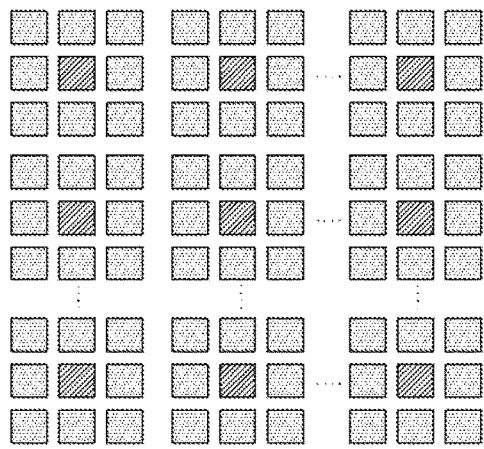

FIGS. 17A, 17B, and 17C illustrates an arrangement of a patch antenna for transmission and a patch antenna for reception according to various embodiments of the present disclosure.

Referring to FIGS. 17A, 17B, and 17C, an antenna that is hatched is a patch antenna to be operated for reception, and an antenna that is stippled is a patch antenna to be operated for transmission, and an antenna having no indication therein is configured to not perform transmission and reception operations.

Referring to FIG. 17A, transmission patch antennas and reception patch antennas are illustrated when performing the detecting of the target. Meanwhile, the wireless power transmitting device may configure some of the plurality of patch antennas not to perform transmission and reception. Referring to FIG. 17B, a case is illustrated where it is determined that the target is an object to be charged, and here, the number objects to be charged is one. As shown in FIG. 17B, the wireless power transmitting device may increase the number of the patch antennas for transmission. For example, the wireless power transmitting device may increase the number of patch antennas for transmission in response to the location of the object to be charged. Referring to FIG. 17C, a case is illustrated where it is determined that the target is an object to be charged, and multiple objects to be charged exist. As shown in FIG. 17C, the wireless power transmitting device may increase the number of the patch antennas for transmission. The number of patch antennas for transmission in FIG. 17C may be configured to be greater than the number of patch antennas in FIG. 17B, which enables power to be transmitted to a greater number of objects to be charged.

Meanwhile, in various embodiments of the present disclosure, the wireless power transmitting device may operate a patch antenna for transmission and a patch antenna for reception according to a time division scheme. That is, during a period for transmitting the transmission wave, the wireless power transmitting device may control the determined patch antenna for transmission so as to form the RF wave, and during a period for receiving the reception wave, the wireless power transmitting device may process an RF wave input to the patch antenna so as to analyze the reception wave. In this case, referring to FIG. 17A, the patch antenna for transmission and the patch antenna for reception may be different, but in various embodiments, at least some of the patch antennas may operate as the patch antenna for transmission or the patch antenna for reception according to time.

Figure 18:
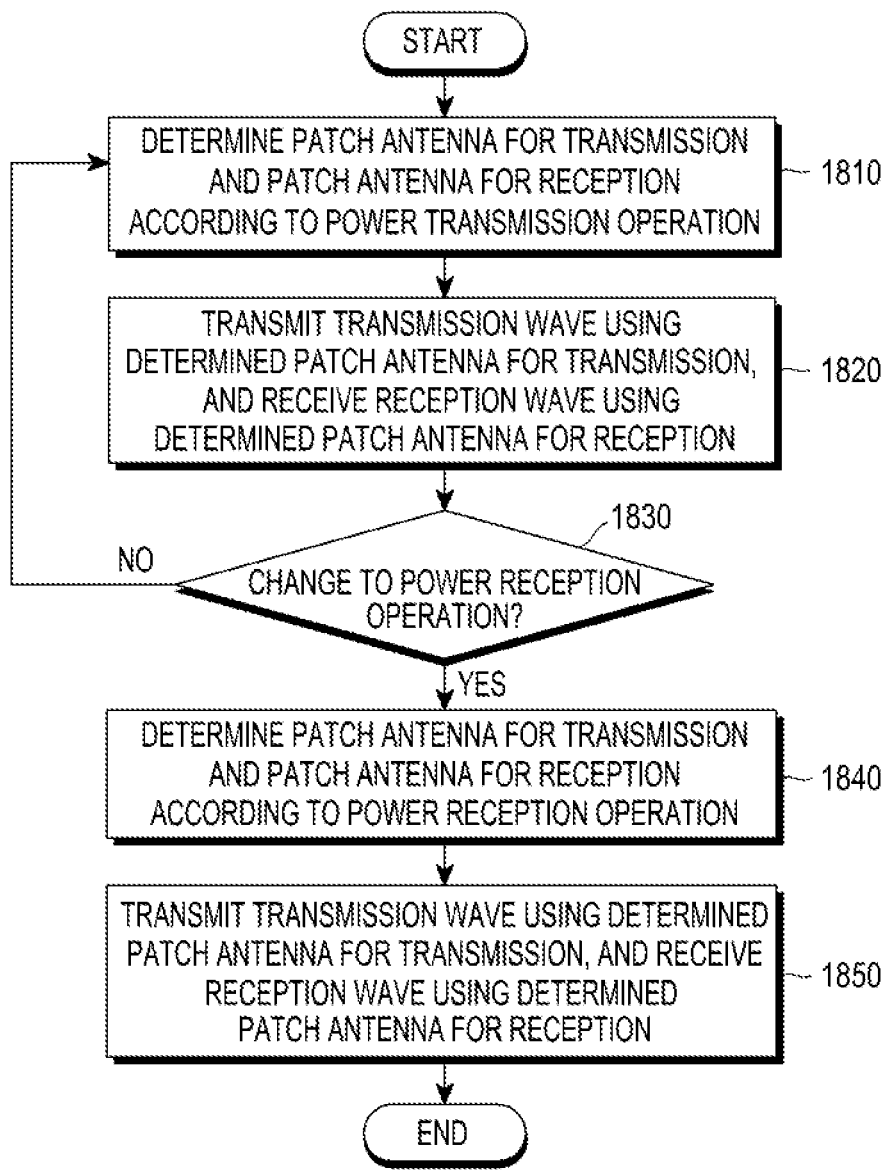
FIG. 18 is a flowchart of a method for a wireless power transmitting device according to an embodiment of the present disclosure.

FIG. 18 is a flowchart of a method for a wireless power transmitting device according to an embodiment of the present disclosure.

Referring to FIG. 18, in operation 1810 the wireless power transmitting device may determine a patch antenna for transmission and a patch antenna for reception according to the power transmission operation. In operation 1820, the wireless power transmitting device may transmit the transmission wave using the patch antenna for transmission, and receive the reception wave using the patch antenna for reception. In various embodiments of the present disclosure, the wireless power transmitting device may operate such that the transmission wave to other electronic devices is formed by some of the patch antennas while receiving an RF wave, i.e., the reception wave, by other patch antennas, from other wireless power transmitting devices. The wireless power transmitting device may process a signal output from the patch antenna for reception into power and store the power in a battery or the like. That is, the wireless power transmitting device may perform both power transmission and power reception. During the power transmission operation, the wireless power transmitting device may perform control so as to transmit the transmission wave through the patch antenna for transmission.

In operation 1830, the wireless power transmitting device may determine whether the power transmission operation changes to the power reception operation. When the operation change is detected, in operation 1840, the wireless power transmitting device may determine a patch antenna for transmission and a patch antenna for reception according to the power reception operation. Accordingly, the wireless power transmitting device may increase the number of patch antennas for reception. In operation 1850, the wireless power transmitting device may transmit the transmission wave using the determined patch antenna for transmission, and receive the reception wave using the determined patch antenna for reception. Alternatively, the wireless power transmitting device may receive only a reception wave using the determined patch antenna for reception.

Figure 19:
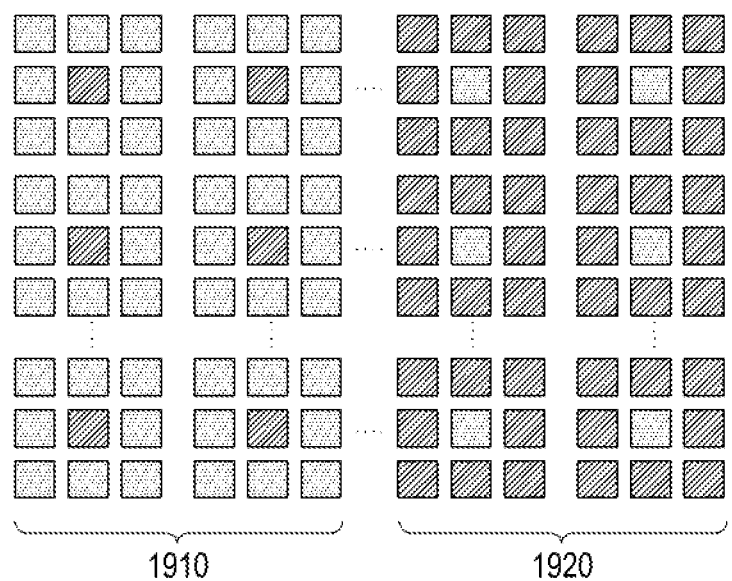
FIG. 19 illustrates an arrangement of a patch antenna for transmission and a patch antenna for reception according to an embodiment of the present disclosure.

FIG. 19 illustrates an arrangement of a patch antenna for transmission and a patch antenna for reception according to an embodiment of the present disclosure.

Referring to FIG. 19, an antenna denoted by hatches is a patch antenna to be operated for reception, and an antenna denoted by stipples is a patch antenna to be operated for transmission.

The wireless power transmitting device may configure patch antennas for transmission among a plurality of patch antennas 1910, located in the left part of an antenna array, to be relatively greater than patch antennas for reception. Some of the antennas on the left side of the plurality of patch antennas may form a transmission wave to transmit wireless power to other electronic devices. The wireless power transmitting device may configure patch antennas for reception located in the right part of the antenna array to be relatively greater in number than patch antennas for transmission. Some of the right part of the plurality of patch antennas may receive a reception wave from another wireless power transmitting device and output a signal.

The patch antennas for transmission and the patch antennas for reception are distinguished from each other and may substantially operate at the same time. Meanwhile, the wireless power transmitting device may operate a patch antenna for transmission and a patch antenna for reception according to a time division scheme. That is, during a period for transmitting the transmission wave, the wireless power transmitting device may control the determined patch antenna for transmission to form an RF wave, and during a period for receiving the reception wave, the wireless power transmitting device may process the RF wave input to the patch antenna to analyze the reception wave. In this case, the patch antenna for transmission and the patch antenna for reception may be different, but in various embodiments, at least some of the patch antennas may operate as the patch antenna for transmission or the patch antenna for reception according to time.

Figure 20:
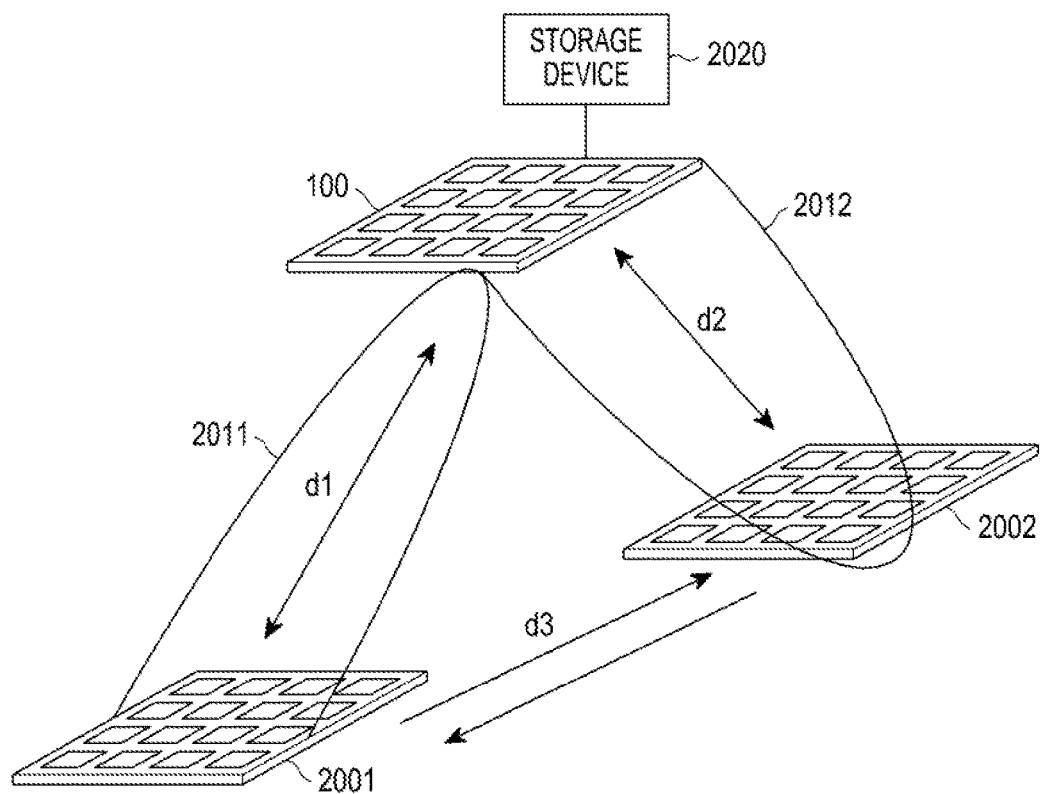
FIG. 20 illustrates a power relay operation according to an embodiment of the present disclosure.

FIG. 20 illustrates a power relay operation according to an embodiment of the present disclosure.

Referring to FIG. 20, a first external antenna 2001 and a second external antenna 2002 are formed using array antennas that include a plurality of patch antennas. The wireless power transmitting device 100 may receive an RF wave 2011 formed from the first external antenna 2001. The wireless power transmitting device 100 may be separated by d1 from the first external antenna 2001. The wireless power transmitting device 100 may store power that is acquired by processing the received RF wave 2011 in a storage device 2020. The wireless power transmitting device 100 may form an RF wave 2012 toward the second external antenna 2002. The wireless power transmitting device 100 may be separated by d2 from the second external antenna 2002. Accordingly, power from the first external antenna 2001 may be relayed to the second external antenna 2002 through the wireless power transmitting device 100. Although the first external antenna 2001 and the second external antenna 2002 are separated by d3 where the wireless power cannot be transmitted, the long-distance power transmission is possible through a relay operation.

Meanwhile, the wireless power transmitting device may relay the received power to another electronic device using a scheme that is different from an RF scheme (e.g., a resonant scheme or an inductive scheme). In this case, the wireless power transmitting device may include a structure capable of wirelessly transmitting power using a resonant scheme or an inductive scheme, in addition to a structure for receiving wireless power using an RF scheme.

Figure 21:
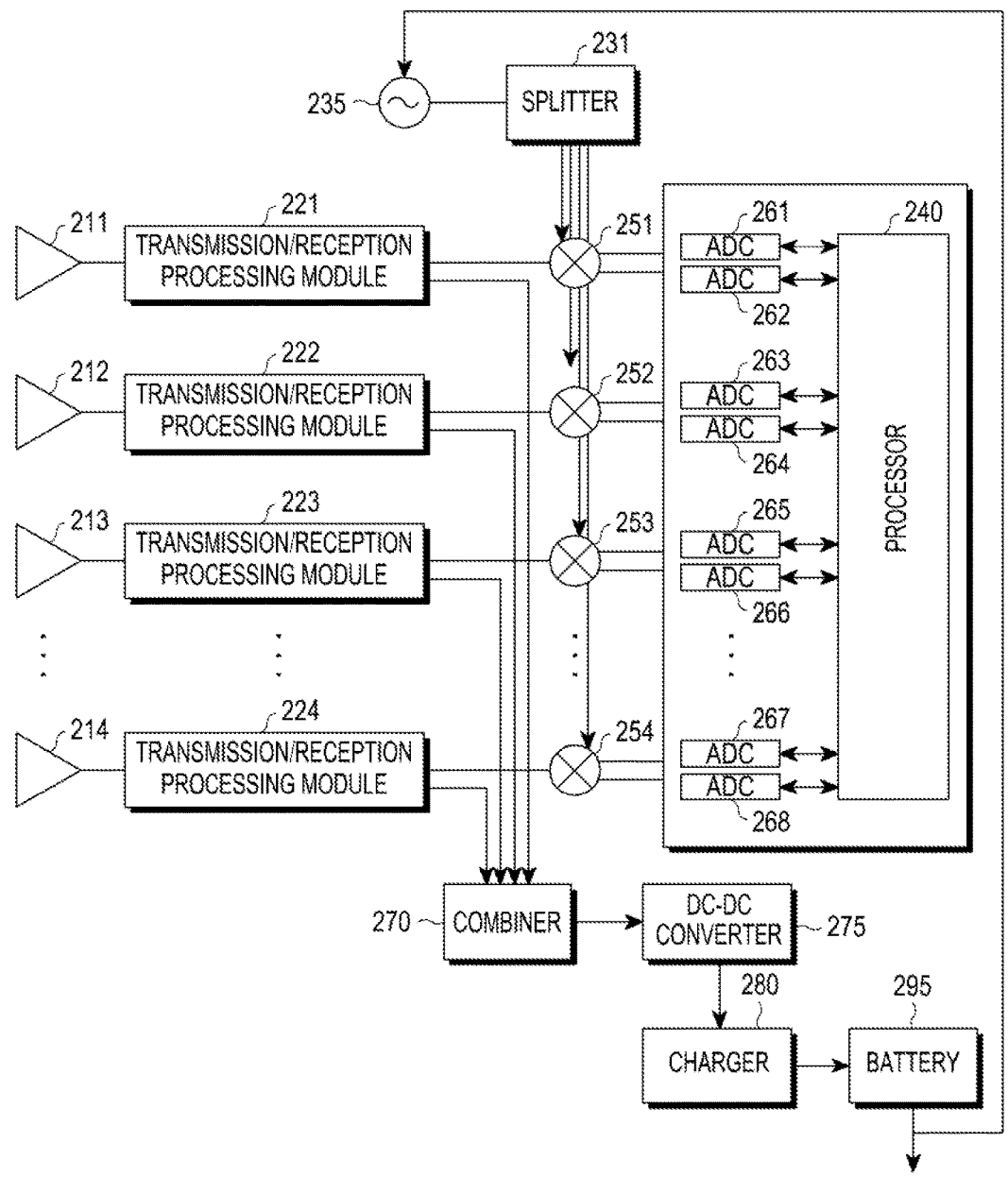
FIG. 21 is a block diagram of a wireless power transmitting device according to an embodiment of the present disclosure.

FIG. 21 is a block diagram of a wireless power transmitting device according to an embodiment of the present disclosure.

Referring to FIG. 21, during power reception the patch antennas 211 to 214 may receive an RF wave, convert the received RF wave into power, and output the power to the transmission/reception processing circuits 221 to 224. The transmission/reception processing circuits 221 to 224 may process the received power to be suitable for storage and output the processed power to a combiner 270. The combiner 270 may collect the processed power supplied from the transmission/reception processing circuits 221 to 224 and output the same to a DC-DC converter 275. The DC-DC converter 275 may convert the magnitude of the voltage of the collected power from the combiner 270 and output the same to a charger 280. The charger 280 may regulate at least one of the voltage and current of the input power, and output the same to the battery 295, and the battery 295 may perform charging using the regulated power.

Figure 22:
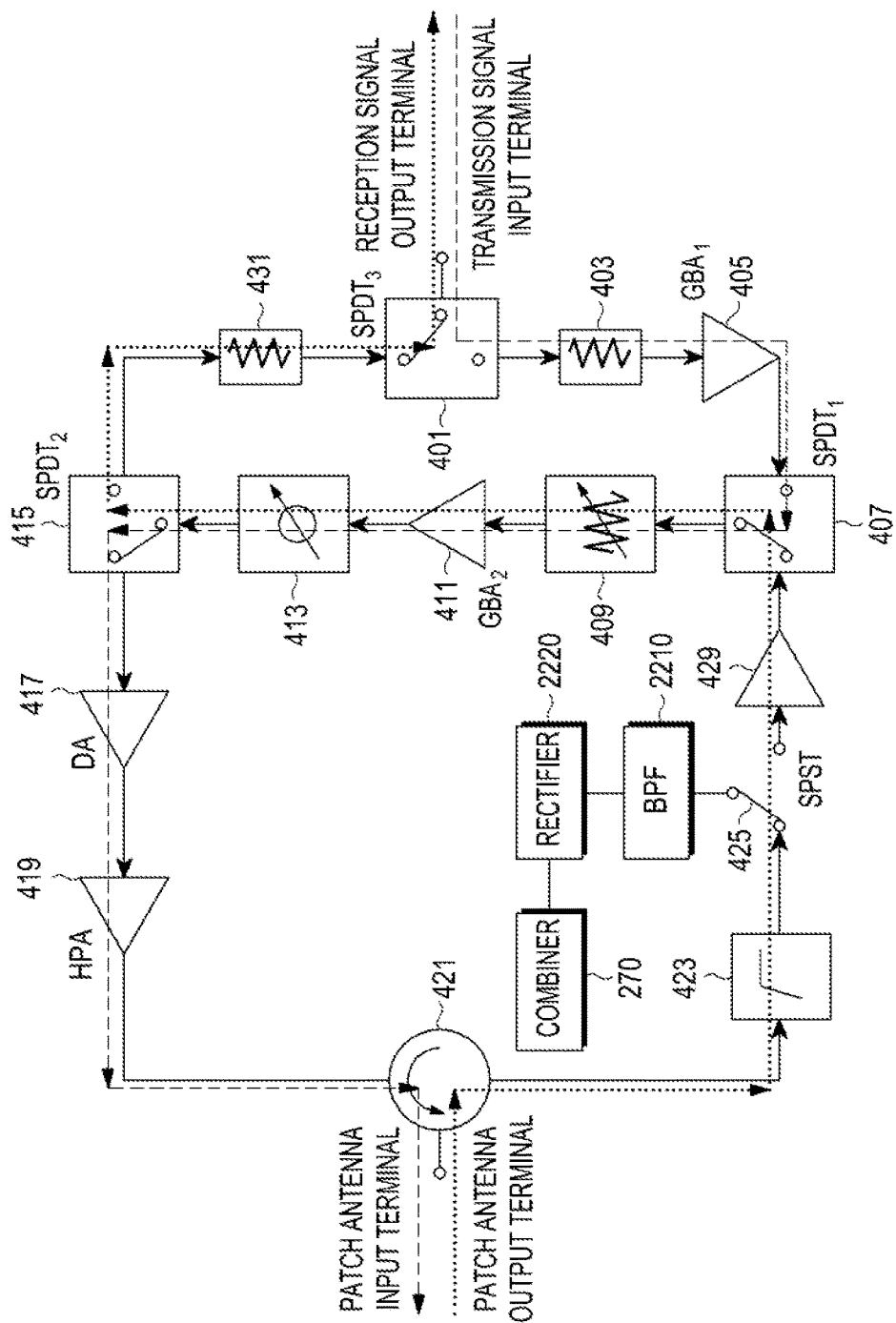
FIG. 22 is a circuit diagram of a wireless power transmitting device according to an embodiment of the present disclosure.

FIG. 22 illustrates a circuit diagram of a wireless power transmitting device according to an embodiment of the present disclosure.

Referring to FIG. 22, a signal output from a patch antenna may be filtered through a limiter 423, and then filtered through a bandpass filter 2210, and provided to a rectifier 2220. The rectifier 2220 may rectify the signal input after being filtered to a DC waveform, and output the same to the combiner 270.

Figure 23A:
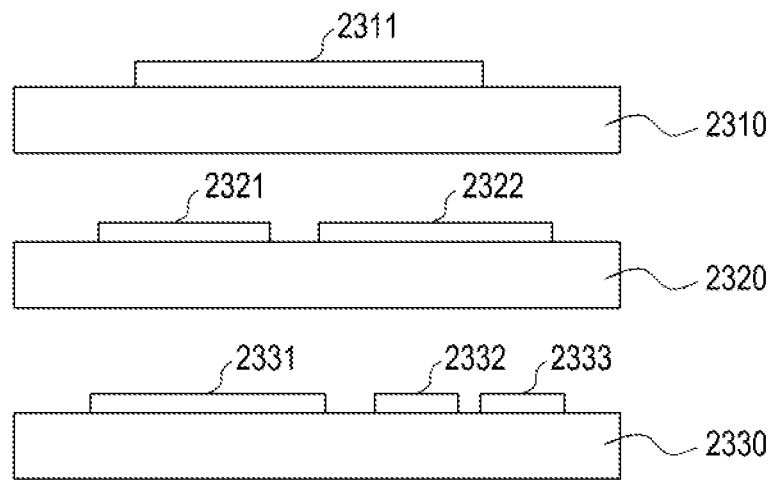
FIGS. 23A, 23B, and 23C illustrate a patch antenna of a wireless power transmitting device according to an embodiment of the present disclosure.
Figure 23B:
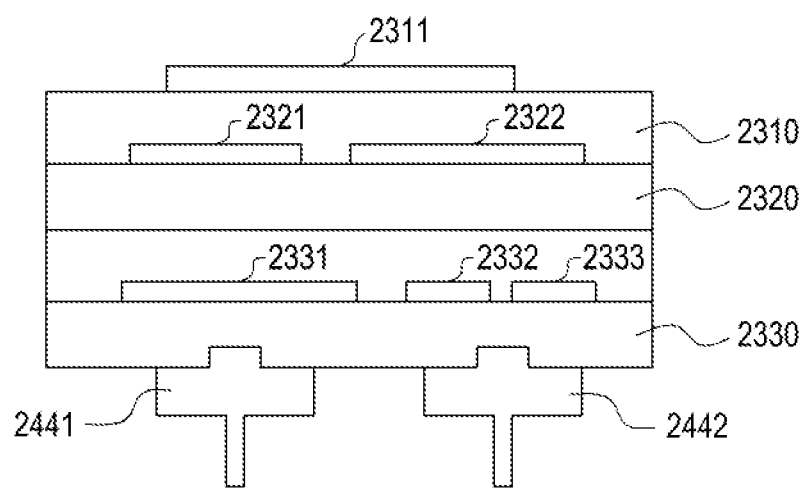
Figure 23C:
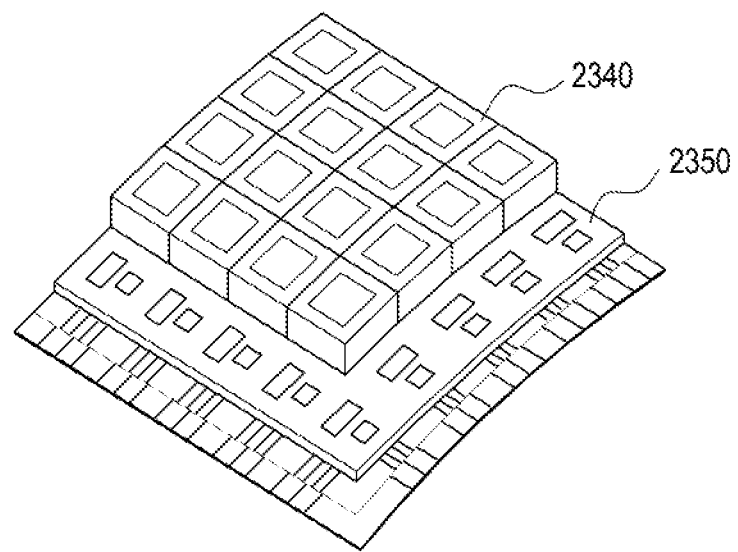

FIGS. 23A, 23B, and 23C illustrate a patch antenna of a wireless power transmitting device according to various embodiments of the present disclosure.

Referring to FIGS. 23A, 23B, and 23C, a patch antenna 2311 may be located at the uppermost position, and may be disposed on a substrate 2310. Meanwhile, a substrate 2320 for transmission may be disposed in a lower part of the substrate 2310 of the patch antenna 2311, and hardware 2321 and 2322 for transmission may be disposed on the substrate 2320 for transmission. On the other hand, a substrate 2330 for reception may be disposed in a lower part of the substrate 2320 for transmission, and hardware 2331, 2332, and 2333 for reception may be disposed on the substrate 2330 for reception. On the other hand, the hardware used for both transmitting a transmission wave and receiving a reception wave may be divided and disposed onto the substrate 2320 for transmission and the substrate 2330 for reception. On the other hand, input/output terminals 2441 and 2442 may be connected to the substrate 2330 for reception. The patch antenna 2311, the hardware 2321 and 2322 for transmission, and the hardware 2331, 2332, and 2333 for reception may be connected through a via hole, respectively, so that an integrated module in the form of a tile can be implemented. FIG. 23C illustrates a cross-section of an implementation. A digital control board 2350 may be connected to a lower part of an integrated module 2340. As described above, the two-dimensional size of the entire module can be reduced, and the size of the entire system can be reduced.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A wireless power transmitting device comprising:
a power source;
a patch antenna;
a transceiver circuit; and
a processor configured to:
control the transceiver circuit to transmit, through the patch antenna, a first signal provided from the power source during a first period,
control the transceiver circuit to receive, through the patch antenna, a second signal based on a reflection of the first signal during a second period,
determine whether a target device is detected based on the second signal, and
in response to determination that the target device is detected, control the transceiver circuit to transmit, through the patch antenna, power to the target device,
wherein the first period does not overlap with the second period.

2. The wireless power transmitting device of claim 1, wherein the transceiver circuit comprises a circulator, and wherein the processor is further configured to:
connect, through the circulator, the transceiver circuit to an input terminal of the patch antenna during the first period, and
connect, through the circulator, the transceiver circuit to an output terminal of the patch antenna during the second period.

3. The wireless power transmitting device of claim 1, wherein the processor is further configured to determine at least one of whether the target device is located within a power transmitting area, a position of the target device, a direction of the target device, a type of the target device, and a shape of the target device based on the second signal.

4. The wireless power transmitting device of claim 3, wherein the processor is further configured to determine that the target device is located within the power transmitting area based on a signal output from the patch antenna at a previous time interval being different from the second signal, or based on a magnitude of the second signal being equal to or greater than a predetermined threshold value.

5. The wireless power transmitting device of claim 1, wherein the transceiver circuit comprises at least one of:
a phase shifter configured to control phase of the first signal and the second signal by the processor, and
an attenuator configured to control magnitudes of the first signal and the second signal by the processor.

6. The wireless power transmitting device of claim 5, further comprising:
an oscillator configured to output a third signal; and
a mixer configured to modulate the third signal and demodulate the second signal,
wherein the transceiver circuit further comprises a first switch and a second switch, and
wherein the processor is further configured to:
control the transceiver circuit to connect, using the first switch, the third signal to at least one of the phase shifter and the attenuator during the first period, and
control the transceiver circuit to connect, using the first switch, the second signal to at least one of the phase shifter and the attenuator during the second period,
control the transceiver circuit to connect, to the patch antenna using the second switch, a controlled signal output from at least one of the phase shifter and the attenuator during the first period, and
control the transceiver circuit to connect, to the mixer using the second switch, the controlled signal output from at least one of the phase shifter and the attenuator during the second period.

7. The wireless power transmitting device of claim 6, further comprising:
a first analog-to-digital converter (ADC) configured to convert data from the processor into an analog signal and provide the analog signal to the mixer during the first period; and
a second ADC configured to convert a demodulated analog signal provided from the mixer into a digital signal and provide the digital signal to the processor during the second period.

8. A wireless power transmitting device comprising:
a power source;
a plurality of patch antennas;
a transceiver circuit; and
a processor configured to:
control the transceiver circuit to transmit, through a first part of the plurality of patch antennas, a first signal provided from the power source, and
control the transceiver circuit to receive, through a second part of the plurality of patch antennas, a second signal based on a reflection of the first signal,
determine whether a target device is detected based on the second signal, and
in response to determination that the target device is detected, control the transceiver circuit to transmit, through at least a part of the plurality of patch antennas, power to the target device.

9. The wireless power transmitting device of claim 8, wherein the processor is further configured to:
control the transceiver circuit to transmit, through the first part of the plurality of patch antennas, the first signal during a first period, and
control the transceiver circuit to receive, through the second part of the plurality of patch antennas, the second signal during a second period, and wherein the first period does not overlap with the second period.

10. The wireless power transmitting device of claim 8, wherein the first part of the plurality of patch antennas is different from the second part of the plurality of patch antennas,
wherein the processor is further configured to receive, through the second part of the plurality of patch antennas, the second signal during a second period, and
wherein the second period is at least partially overlapped with a first period when the first signal is input to the first part of the plurality of patch antennas.

11. The wireless power transmitting device of claim 8, wherein the processor is further configured to determine at least one of whether the target device is located within a power transmitting area, a position of the target device, a direction of the target device, a type of the target device, and a shape of the target device based on the second signal.

12. The wireless power transmitting device of claim 11, wherein the processor is further configured to determine that the target device is located within the power transmitting area, based on a signal output from the second part of the plurality of patch antennas at a previous time interval being different from the second signal, or based on the magnitude of the second signal being equal to or greater than a predetermined threshold value.

13. The wireless power transmitting device of claim 12, wherein, when it is determined that the target device is located within the power transmitting area, the processor is further configured to:
adjust at least one of a number of patch antennas included in the first part of the plurality of patch antennas and a number of patch antennas included in the second part of the plurality of patch antennas,
control the transceiver circuit to transmit, through the first part of the plurality of patch antennas including the adjusted number of patch antennas, a third signal provided from the power source,
control the transceiver circuit to receive, through the second part of the plurality of patch antennas including the adjusted number of patch antennas, a fourth signal based on a reflection of the third signal,
determine at least one of a position and direction of the target device based on the fourth signal, and
determine at least one of a type of the target device and a shape of the target device based on the fourth signal.

14. The wireless power transmitting device of claim 12, wherein the processor is further configured to:
determine that the target device is to be charged based on a communication signal received from the target device, and
determine that the target device corresponds to an obstacle based on the communication signal being not received from the target device.

15. The wireless power transmitting device of claim 14, wherein the processor is further configured to:
determine whether the target device corresponds to a human body, and
when the target device corresponds to the human body, output a warning.

16. The wireless power transmitting device of claim 8, wherein the processor is further configured to:

in response to a first operation, set a number of the first part of the plurality of patch antennas and a number of the second part of the plurality of patch antennas, and
in response to switching from the first operation to a second operation, adjust at least one of the number of patch antennas included in the first part of the plurality of patch antennas and the number of patch antennas included in the second part of the plurality of patch antennas.

17. The wireless power transmitting device of claim 8, wherein the processor is further configured to:
after outputting the second signal, control the transceiver circuit to transmit, through a part of the first part of the plurality of patch antennas, a third signal provided from the power source, and
control the transceiver circuit to receive a fourth signal based on a reflection of the third signal through the second part of the plurality of patch antennas and another part of the first part of the plurality of patch antennas.

18. The wireless power transmitting device of claim 17, wherein the transceiver circuit further comprises a circulator, and
wherein the processor is further configured to:
control the transceiver circuit to release, through the circulator, a connection to an input terminal of the other part of the first part of the plurality of patch antennas, and
control the transceiver circuit to connect, through the circulator, to an output terminal of the other part of the first part of the plurality of patch antennas.

19. The wireless power transmitting device of claim 8, wherein the transceiver circuit comprises at least one of a phase shifter configured to control phase of the first signal and the second signal by the processor, and an attenuator configured to control magnitudes of the first signal and the second signal by the processor.

20. The wireless power transmitting device of claim 19, further comprising:
an oscillator configured to output a third signal; and
a mixer configured to modulate the third signal and demodulate the second signal,
wherein the transceiver circuit further comprises a first switch and a second switch, and
wherein the processor is further configured to:
control the transceiver circuit to connect, using the first switch, the third signal to at least one of the phase shifter and the attenuator, or
control the transceiver circuit to connect, using the first switch, the second signal to at least one of the phase shifter and the attenuator,
control the transceiver circuit to connect, to a first patch antenna using the second switch, a controlled signal output from at least one of the phase shifter and the attenuator, and
control the transceiver circuit to connect, to the mixer using the second switch, the controlled signal output from at least one of the phase shifter and the attenuator.

* * * * *